US011410575B2

(12) United States Patent
Luttmer et al.

(10) Patent No.: US 11,410,575 B2
(45) Date of Patent: Aug. 9, 2022

(54) INTERFACE AND TOOLS FOR ACCESSIBLE TEXTBOOK GENERATION

(71) Applicant: American Printing House for the Blind, Louisville, KY (US)

(72) Inventors: Rebecca Marie Luttmer, Chicago, IL (US); William Gene Freeman, Louisville, KY (US); Michael Whapples, Melton Mowbray (GB); Larry Dean Skutchan, Louisville, KY (US); Daniel Keith Creasy, Louisville, KY (US); Corey D. Knapp, Louisville, KY (US); Leonardo M. Blakey, Louisville, KY (US); Rezylle Gay Milallos, Louisville, KY (US); William P. Tribbey, Clarksville, IN (US)

(73) Assignee: American Printing House for the Blind, Inc., Louisville, KY (US)

( * ) Notice: Subject to any disclaimer, the term of this patent is extended or adjusted under 35 U.S.C. 154(b) by 920 days.

(21) Appl. No.: 16/168,206

(22) Filed: Oct. 23, 2018

(65) Prior Publication Data
US 2019/0122579 A1    Apr. 25, 2019

Related U.S. Application Data

(60) Provisional application No. 62/707,145, filed on Oct. 23, 2017.

(51) Int. Cl.
*G09B 21/00*    (2006.01)

(52) U.S. Cl.
CPC ......... *G09B 21/005* (2013.01); *G09B 21/007* (2013.01)

(58) Field of Classification Search
CPC ........................... G09B 21/005; G09B 21/007
See application file for complete search history.

(56) References Cited

U.S. PATENT DOCUMENTS

2014/0210828 A1*  7/2014  Fleizach ................. G06T 11/60
                                                                    345/467

* cited by examiner

*Primary Examiner* — Dmitry Suhol
*Assistant Examiner* — Alyssa N Brandley
(74) *Attorney, Agent, or Firm* — Frost Brown Todd LLC

(57) ABSTRACT

A system configured to provide a transcription building interface may be usable by transcribers to produce versions of textbooks and other works in accessible formats such as braille. The interface may receive data from a publisher of a work, such as a NIMAS file set, which provides a starting point for transcription but must be further modified to produce a production ready braille version. The interface presents a print display, a braille display, and a style display of the underlying data, and may receive input modifying the content of one or more of those displays, with any changes synchronized across each. The interface further provides toolsets that may be used to automate the creation of certain complex content in braille, including tools for describing lists, mathematical concepts, and images, which have conventionally been manually encoded.

17 Claims, 17 Drawing Sheets

```
New Document  [6780Sdusr7507WMASxml ⊠
              > SECTION:level1 > CONTAINER:LIST > BLOCK:LI-3

Body Text       Put your research into writ.<
Cell 5 Heading        Common Core
Body Text*           W 7, W 8, W 9
Body Text       Interactive Lessons
LI-3            1. Introduction
LI-3            2. Synthesizing Information
LI-3            3. Writing an Outline
LI-3            4. Summarizing, Paraphrasing,
LI-3            5. Attribution
Body Text       Participating in Collaborat
                discussions
Cell 5 Heading        Common Core
Body Text*           SL 1
Body Text       There's power in putting yo
Body Text       Interactive Lessons
LI-3            1. Introduction
LI-3            2. Preparing for Discussion
LI-3            3. Establishing and Following >

Print Page: aoaii | Braille Page: B36 | Line: 7 | Cell Number: 17 | Style: LI-3 |
```

FIG. 6A

INTERFACE AND TOOLS FOR ACCESSIBLE TEXTBOOK GENERATION

PRIORITY

This application claims the benefit of U.S. provisional patent application 62/707,145, filed Oct. 23, 2017, the entirety of which is hereby incorporated by reference.

FIELD

The disclosed technology pertains to a system for the creation of accessible textbooks and other works.

BACKGROUND

Transcribing textbooks and other works so that they are accessible to those with disabilities is an important task. For example, many textbooks that are required for educational courses at all levels are not offered by their original publishers in braille, due to the time, cost, and relative lack of demand for braille versions. As a result, the time and cost of producing braille versions is passed onto third party transcription services and specialized publishers, causing availability for the braille version to be delayed for months beyond the availability of the print version. Even in a best-case scenario, where production of a braille version begins simultaneously with availability of the final print version, there may be months of delay while the braille version is transcribed and embossed to create physical braille copies. The real-world impact of this is that in some cases a visually impaired student may not have access to a required text until weeks or months into an academic semester, which can negatively impact their ability to learn and follow the course, or may cause them to delay or avoid taking the course until a braille version text becomes available.

Conventionally, transcription of braille texts is a largely manual process. Skilled transcribers must review a print version of a text, and apply complex formatting rules to produce a braille version that not only contains all of the printed information of a print versions, but also accurately depicts the nuances of the print version. For example, special braille designations must be used to denote such details as text formatting (e.g., italics, bold, underlined), text organization (e.g., headers, body sections, footers, offset sections), images (e.g., image descriptions may be inserted), and mathematical notations for symbols, formulas, and equations. With only 64 different braille dot patterns available, and a wide range of letters, numbers, symbols, styles, structures, mathematical data, and other visual nuances to convey, it becomes apparent why rules for transcribing, formatting, and producing braille texts are so complex.

The need to increase the efficiency of the transcription of works into braille led to the creation of the National Instructional Materials Accessibility Standard (NIMAS) in IDEA 2004. IDEA required that states adopt NIMAS as the source file format for use in the production of accessible formats for K-12 textbooks and core print instructional materials. In compliance with the NIMAS provisions of IDEA 2004, publishers supply NIMAS files to the National Instructional Materials Access Center (NIMAC). Based on the DAISY Standard, NIMAS XML files must validate to the Z39.86 specification to be accepted into the NIMAC. When these well-structured files are available, they provide an excellent starting point for braille transcription. However, while NIMAS file sets contain all of the text and images present in a work, the XML markup does not fully describe the visual layout of the text or provide all of the markup needed for correct braille textbook formatting, which can be complex. Finished braille versions require significant additional effort from transcribers.

Conventional software tools used by braille translators to work with NIMAS file sets are limited. In most cases, NIMAS XML must be back converted into RTF or another file format in order to be ingested into braille translation software. This leads to the loss of much of the valuable semantic tagging provided in the original NIMAS file, including structure that must then be added back into the translated document by the transcriber. The complexity of braille formatting, which requires the knowledge of a skilled transcriber, and the lack of support for direct ingestion of XML, as well as other noted issues, all contribute to the production of braille being time consuming, expensive, and often reactive to demand rather than proactive.

What is needed, therefore, is an improved system for producing accessible textbooks and other works.

BRIEF DESCRIPTION OF THE DRAWINGS

The drawings and detailed description that follow are intended to be merely illustrative and are not intended to limit the scope of the invention as contemplated by the inventors.

FIG. 6A shows a screenshot of an exemplary implementations of the builder interface;

DETAILED DESCRIPTION

The inventors have conceived of novel technology that, for the purpose of illustration, is disclosed herein as applied in the context of creating accessible textbooks and other works. While the disclosed applications of the inventors' technology satisfy a long-felt but unmet need in the art of creating accessible textbooks, it should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

Existing software tools do not provide the unconventional capabilities, features, and tools disclosed herein in any arrangement, and especially not in the unconventional combinations and arrangements disclosed herein. One or more of the disclosed features, tools, interfaces, or combinations and arrangements thereof may be implemented to advantageously provide an improved interface for transcribing and producing accessible textbooks and other works. By creating, organizing, and storing datasets displayed via the interface using one or more of the methods disclosed herein, the functioning of a computer providing the interface is improved and multiple datasets may be displayed, modified, and synchronized efficiently and in near real-time. These datasets may also be separately maintained during transcription work, which maintains their ability to be associated and synchronized with each other through updates and changes to one dataset, and their ability to be expressed in various standard formats that may improve their portability between applications, devices, and accessible text standards and rules such as those for expressing mathematical concepts in braille.

Figure 1:
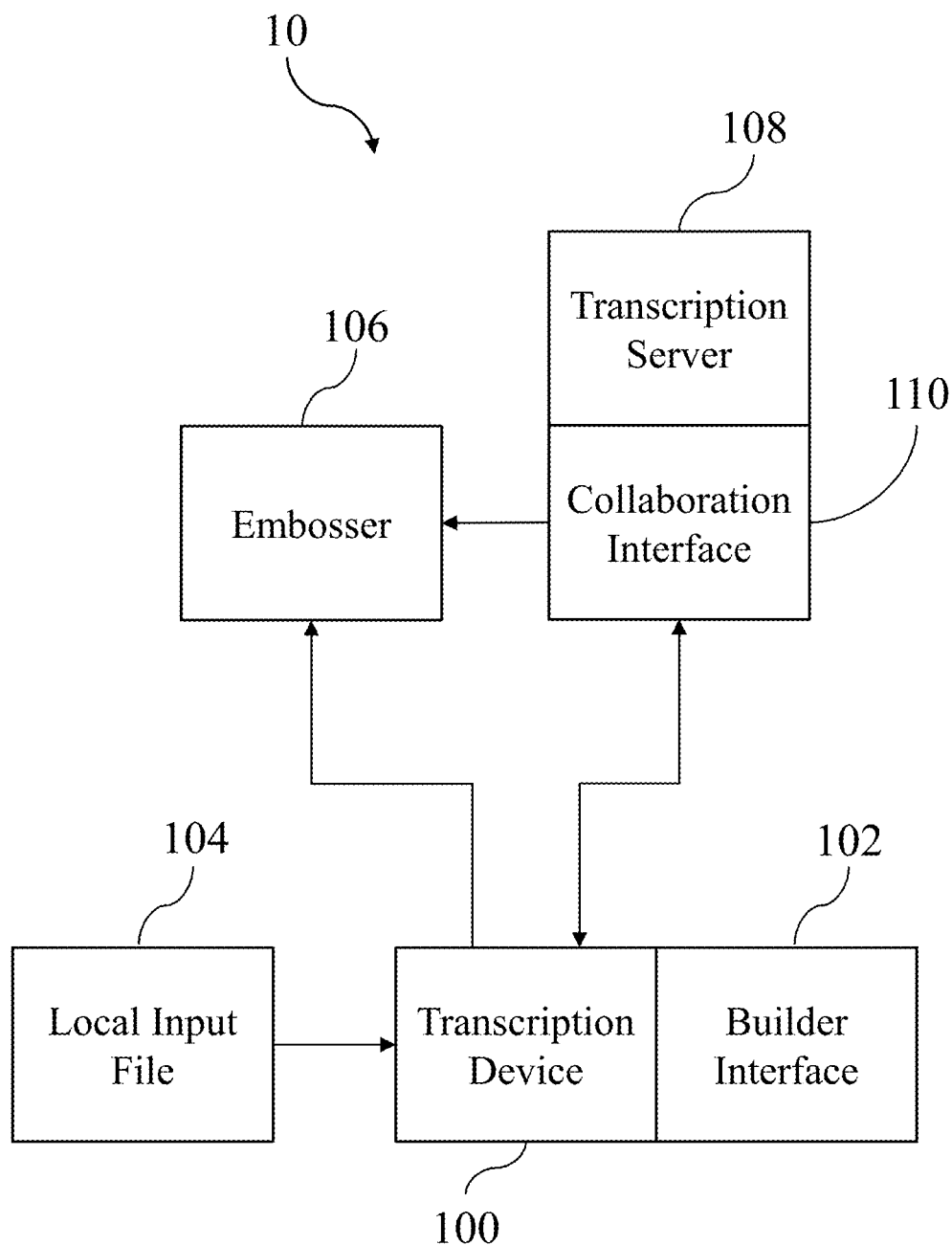
FIG. 1 shows a schematic diagram of an exemplary system for producing accessible textbooks and other works.

Turning now to the figures, FIG. 1 shows a schematic diagram of an exemplary system for producing accessible textbooks and other works. The transcription system (10) includes a transcription device (100) configured to provide a builder interface (102) that a transcription user may interact with when creating an accessible work. The transcription device (100) may be a laptop computer, desktop computer, tablet device, or other computing device having a memory, processor, display, user inputs, and other typical features capable of receiving, storing, processing, manipulating, and transmitting various types of data. The builder interface (102) may be a software application installed on the transcription device (100), or configured to be accessible by the transcription device (100) over a network such as a LAN or WAN (e.g., a website, software interface, or other communication channel). The transcription device (100) may receive datasets associated with accessible works as local input files (104) via a physical medium (e.g., a disk such as a DVD-ROM or CD-ROM), a connected memory (e.g., a USB connected flash drive), via a network connection (e.g., downloaded from a website, received in an e-mail), or other similar means.

The contents and form of local input files (104) may vary by implementation, and may be, for example, plain text, rich text, structured text (e.g., XML, HTML, or other formats), or encoded or non-text formats that may require a particular software application to open and view (e.g., DOC, ZIP). While the local input file (104) may not be available for all works that may be transcribed, where it is available, a transcriber using the transcription device (100) may receive the local input file (104) to provide a starting point for their transcription work. As one example, "NIMAS" is a file format established by IDEA 2004 for use in the production of accessible formats for K-12 instructional materials. It consists of an XML file containing the text content, and separate image files for all images from the print book. Valid NIMAS must also include a package file (OPF) and a title page and copyright page PDF, supplied for use in file verification and cataloging processes. Publishers producing NIMAS file sets can use the raw data they have prepared for their printed works (e.g., text, style, layout, organization, images) to prepare a NIMAS file set. While NIMAS files include the complete contents of the printed book, production of a high quality braille text requires significant additional work to supply the braille formatting, annotations, and other organizations as will be described below.

While the NIMAS file set may not contain all of the data required to produce fully formatted braille textbooks, it can significantly reduce the time and effort required of the transcriber as compared to transcribing from a physical copy of a work. As one example, a transcriber may spend 100 hours producing an output file for a braille embossing machine (e.g., BRF, PEF) from scratch (i.e., with no NIMAS file set).

One advantage of receiving the local input file (104) at the transcription device is that transcription can be performed entirely offline. This may be useful when the transcription device (100) has no access or limited access to a communication network, as the local input file (104) and any output can be exchanged locally using portable memory devices or discs. In some implementations, where the transcription device (100) is connected with a network or otherwise capable of communication with remote devices, the transcription device may be in communication with a transcription server (108) via a collaboration interface (110). The transcription server (108) may be one or more physical, virtual, or cloud hosted servers and databases configured to store datasets related to accessible works (e.g., NIMAS file sets, BRF or PEF files, or transcription project datasets for transcriptions that are in progress). The transcription server (108) may also be configured to provide the collaboration interface (110), which transcribers can use to remotely manage and collaborate on transcription projects.

The collaboration interface (110) may be accessible as, for example, a website, a software application interface, or another communication interface. In such an implementation, the transcription device (100) may receive accessible work datasets (e.g., full or partial NIMAS file sets, full or partial BRF or PEF files, full or partial in progress transcription datasets) from the collaboration interface (110). The collaboration interface (110) may be configured to provide such data upon a request of the transcriber or it may be assigned to a transcriber by a project manager or other administrator in charge of the transcription project. The collaboration interface (110) may also provide such features as version management, file backup and storage, transactional management (e.g., projects or portions of projects may be checked out and locked by a transcriptionist to prevent duplicative efforts), and team management features that allow a manager to assign individual portions of a NIMAS file set to different transcribers so that separate sections of the accessible work may be produced by multiple transcribers in parallel.

The transcription system (10) may also comprise an embosser (106), which is operable to receive input datasets (e.g., a BRF or PEF file) and produce a physical braille version of a transcribed work. The embosser (106) differs from conventional printing devices in various ways, for example, it requires specific formats produced by the transcription system (10), and it may produce sheets with tactile cells rather than printed ink text.

Figure 2:
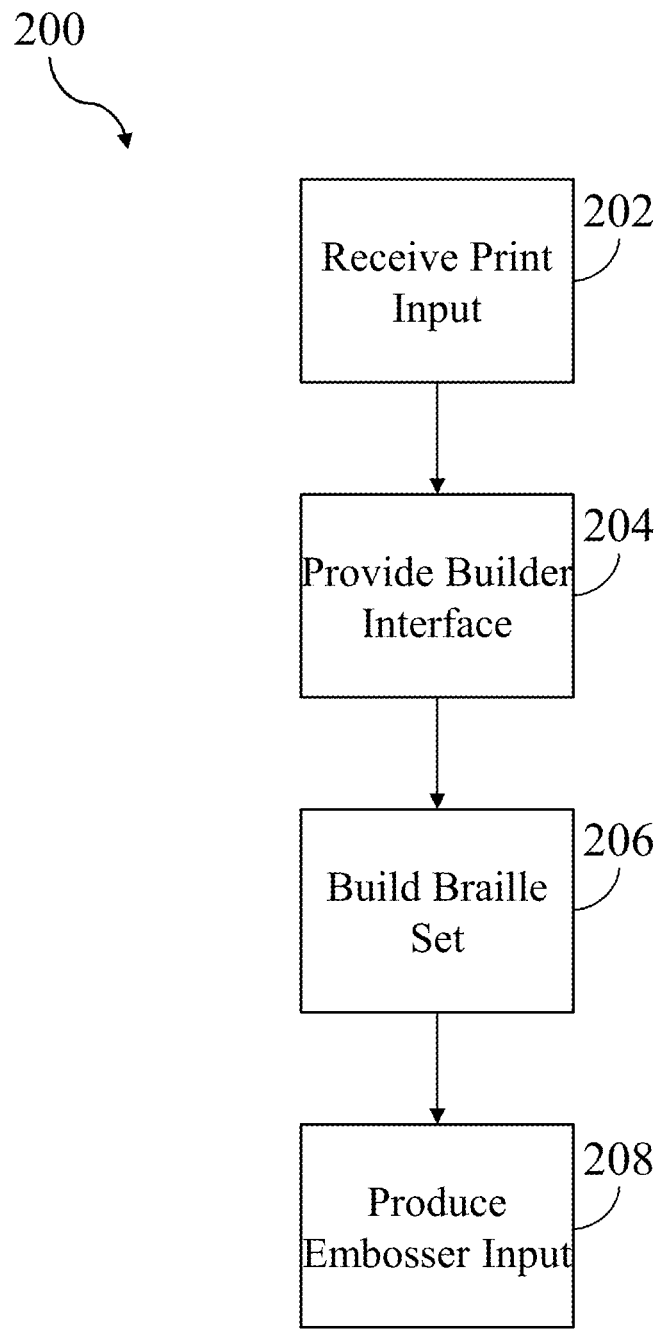
FIG. 2 shows a set of exemplary high-level steps that may be performed to produce an accessible textbook or other work.

The builder interface (102) provides a number of features and advantages to a transcriptionist using the transcription system (10). While the transcription system (10) may be used to produce various accessible works, for the sake of clarity, the discussions below will reference braille versions. However, it should be noted that many of the tools, features, interfaces, and techniques described herein may be applied to transcription systems (10) for other types of accessible works. For example, FIG. 2 shows a set of exemplary high-level steps (200) that may be performed on a device such as the transcription device (100), using an interface such as the builder interface (102), to aid a transcriptionist in producing an accessible work. The transcription system (10) may receive (202) print input, which may be a data of various types (e.g., text data, NIMAS file sets, EPUB files), or in cases where such data is not available, may be a physical printed work. The transcription system (10) may then provide (204) the builder interface (102) which the user may interact with to view, modify, and complete the transcription of the print input. The system (10) may build (206) an accessible dataset describing a braille or other accessible version of the print input, based upon the user's interactions with the builder interface (102). Once built (206), the braille set may then be used to produce (208) files and inputs that may be used by an embosser such as the embosser (106) or another device to produce a physical braille work. While FIG. 2 provides a high level summary, FIGS. 3-4 and 15-16 provide more detailed descriptions of one or more of the steps above.

Figure 3:
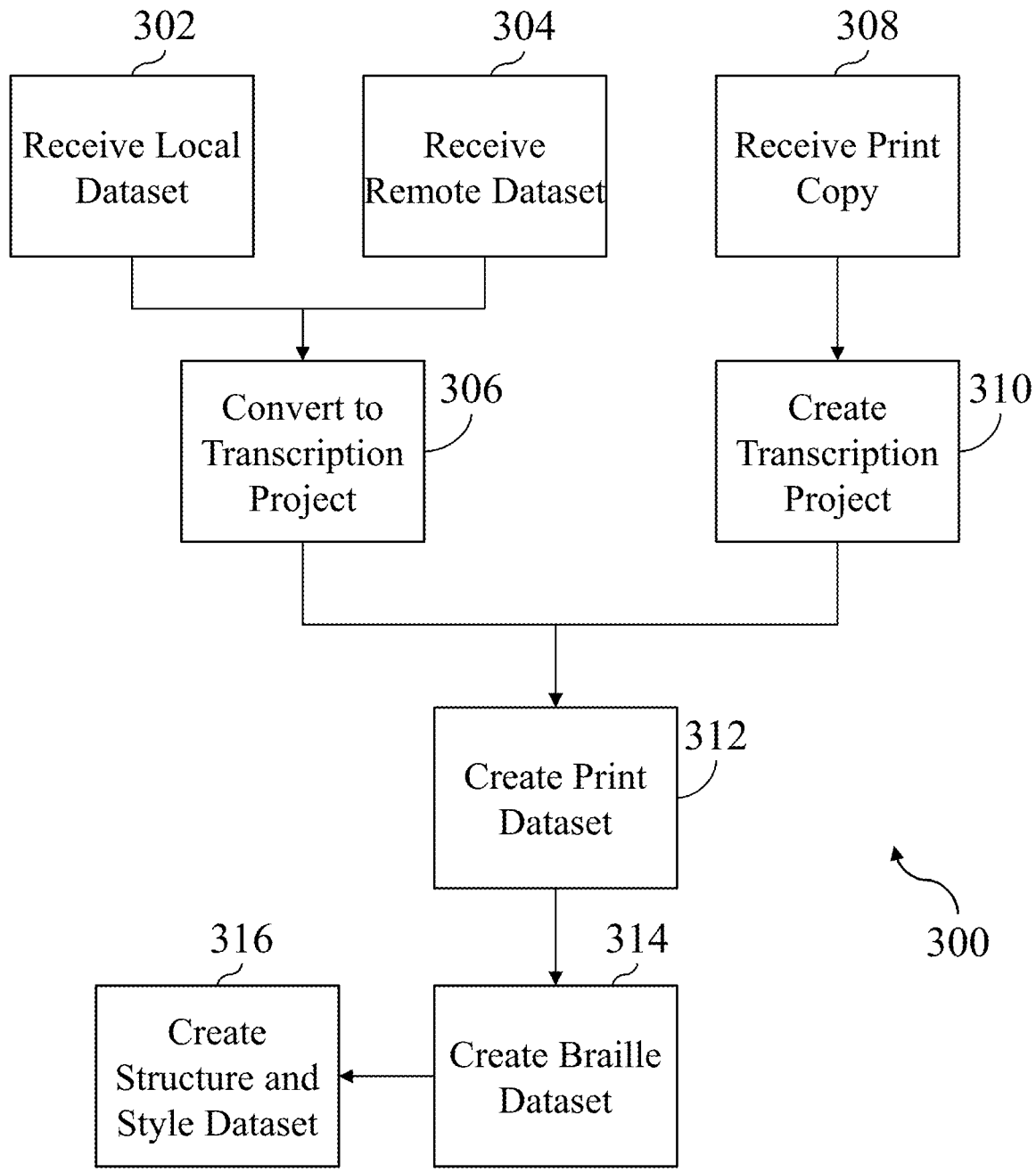
FIG. 3 shows a set of exemplary steps that may be performed to receive and prepare datasets associated with an accessible textbook or other work.

For example, with reference to FIG. 3, that figure shows a set of exemplary steps (300) that may be performed to receive print inputs and prepare datasets associated with producing a braille version. Print inputs may be received (302) locally as a dataset (e.g., received at the transcription device (100) via a portable memory device as has been described), may be received (304) from a remote source as a dataset (e.g., received at the transcription device (100) from the transcription server (108)), or may be received (308) as a physical print copy, for example. Datasets received locally (302) or remotely (304) may be converted (306) to a transcription project. This may include opening an already existing project or dataset, if compatible (e.g., a NIMAS file set or a pre-existing project dataset may be directly opened using the builder interface (102)), but may also include modifying some or all of the dataset (e.g., converting text into XML, or converted one structured format such as XML into another structured format such as JSON and EPUB), creating project files proprietary to the builder interface (102) (e.g., creating files locally on the transcription device (100) to store the dataset in a form usable by the builder interface (102), creating data remotely on the transcription server (108) to store the dataset in a form usable by the builder interface (102)), and identifying and attempting to automatically fix or flag any errors in the dataset, for example.

As an illustration of how conversion (306) may take place, one exemplary embodiment may convert a NIMAS input file into braille project file, which may use a different XML structure that is optimized (e.g., the structured data may be flattened to reduce deep nesting of objects, as will be described in greater detail below) for loading, searching, and modifying the contained data in real time. Such a project file may be differentiated from a NIMAS input file or other XML content by using a different file extension to indicate that it has a proprietary design or contents. As another example of conversion (306), where a NIMAS input file contains sets of images, the NIMAS input file may be converted into a braille project file that is capable of storing optimized XML content, as well as images (e.g., an archive file type).

As an example of a proprietary file type that may be created from a NIMAS input file, a *.bbx file type may be used to store a braille project. A *.bbx file may use a markup language such as XML to store structured content in an optimized way that may be efficiently accessed, searched, and updated as compared to the NIMAS input file. A NIMAS file may be undesirable for storing braille projects as they are being modified, because structured data in NIMAS file sets is often nested very deeply in order to comply with NIMAS output standards. As an example, structured data in a NIMAS file may be hierarchically nested ten or more levels deep in some instances, such as where a table of contents contains a list, the list contains items, each list item itself may contain another sub-list, each sub-list may contain text having different types of style or emphasis, and so on. As a result, opening, interpreting, and fully visualizing a NIMAS file set may be an inefficient task, as each nested object must be fully explored to its final sub-component, and some nested objects may be unnecessary (e.g., where a list object only has one item, which itself is a sub-list having only one item).

Conversion into a *.bbx file type from NIMAS reduces such unnecessary nesting (e.g., a maximum nest depth of 2-3 layers), by instead associating attribute descriptors with objects. For example, text objects in a list may be directly associated with an attribute such as "list1" to indicate a first item in a list, "list2" to indicate a second item in a list in order to produce structured data where the content (e.g., text within "<p></p>" tags) is one level deep, such as:

<list><p attr=list1>Item 1</p><p attr=list2>Item2</p></list>

A comparable table expressed in NIMAS may instead store content two levels deep, such as:

<list><li><p attr=list1>Item 1</p></li><li><p attr=list2>Item2</p></li></list>

By producing a flatter and less nested file, such as the *.bbx file, project content may be accessed more quickly, and may be edited and updated more quickly as compared to a NIMAS file with an arbitrary or unlimited nesting depth. A variation on a *.bbx file type is a *.bbz file type, which incorporates the contents of the *.bbx file type and also includes one or more images that are associated with the work and provided in the NIMAS file.

When the input is received (308) as a print copy, the system (10) may create (310) a transcription project comprising files, datasets, other objects usable by the builder interface (102) to receive, store, and organize the project as it is transcribed by the transcriptionist. For example, in an implementation that receives (302) NIMAS file sets, the NIMAS file sets may be immediately usable by the builder interface (102) after conversion (306). When no file set is available, and only a print copy is received (308), the builder interface (102) may create (310) a set of directories and files for a blank file set that may receive transcribed input as the builder interface (102) is used.

One feature that may be implemented in the builder interface (102) is to receive input and present it in multiple forms within the same interface view. For example, the interface may receive a file set or other input dataset and extract data in order to create (312) a print dataset. The print dataset may be visually readable text in various languages, may be organized sequentially as it may appear in a print book, and may additionally have some associated formatting causing portions of text to be visually styled in a certain way (e.g., bolded, italicized, underlined), organized in a certain way (e.g., centered, right justified), or associated with a certain type (e.g., a heading, a body, a part of a list). For example, a newline or new paragraph in a text may cause the text to be considered a section of body text, and appear as indented with some vertical separation from the preceding and following sections, while a bulleted list in a text may be associated with a different type and visual representation.

The created (312) print dataset, the received (302) dataset, or both may also be used to create (314) a braille dataset. The braille dataset may be visually represented braille text (e.g., a series of six-dot braille cells) describing the same, or substantially the same content, including styling, organization, and type, as the print dataset, using formats and standards required for braille works as set forth by a group such as the Braille Authority of North America or the National Library Service for the Blind and Visually Handicapped. When referred to herein, it should be understood that creating, displaying, or converting braille from other inputs, such as print or structured inputs (e.g., XML, NIMAS, *.bbx, *.bbz) may include accessing non-braille content such as text or markup structures, and converting non-braille content into braille using one or more conversion standards.

As an example of one such standard, LibLouis is a braille translator tool that may be integrated into software applications that are built in varying languages (e.g., C, Java, Python). A tool such as LibLouis may be configured to convert text content into various types of braille codes (e.g., both English specific braille codes, and braille codes for other languages). While some braille conversion tool sets may provide all necessary conversion tools (e.g., content conversion, style and structure conversion, math conversion), it should be understood that one or more different conversion tool sets may be implemented together in order to provide all necessary conversion functionality. For example, a tool such as LibLouis may convert text content into the desired braille code, but may be unable to convert style and structure content. In such a case, other braille conversions tool sets may be used in conjunction with the output of the LibLouis toolset to create fully formed braille code.

The system (10) may also create (316) a structure and style dataset, based upon the received (302) dataset or other datasets. The structure and style dataset describes the style, organization, and type of each section, word, or character of the text, and can be thought of as a more explicit textual description of the visually readable print dataset. For example, a bolded word in the print dataset will be visually displayed in bold, while the portion of the structure and style dataset associated with the same word will have an explicit textual indication that the word is bold.

One advantage in being able to separately handle each created (312, 314, 316) dataset is that, in some embodiments, they may be separately displayed to a transcriptionist via the builder interface, as will be described in more detail below, with reference to FIG. 4. That figure shows a set of exemplary steps that may be performed to provide features of an exemplary builder interface such as the builder interface (102). A device such as the transcription device (100) may provide the builder interface (102) by displaying (402) and synchronizing one or more datasets, such as the print dataset, the braille dataset, and the style and structure dataset. For example, in implementations displaying each of the print dataset, the braille dataset, and the style and structure dataset, an interface may be displayed that presents each dataset vertically, with the view and cursor position synchronized such that when viewing one section of the print dataset, a corresponding section of the braille dataset and the style and structure dataset is also displayed. Similarly, when placing a text editor cursor at one section of the displayed print dataset, any changes made at that point will be correspondingly made in the braille dataset and the style and structure dataset.

Figure 5:
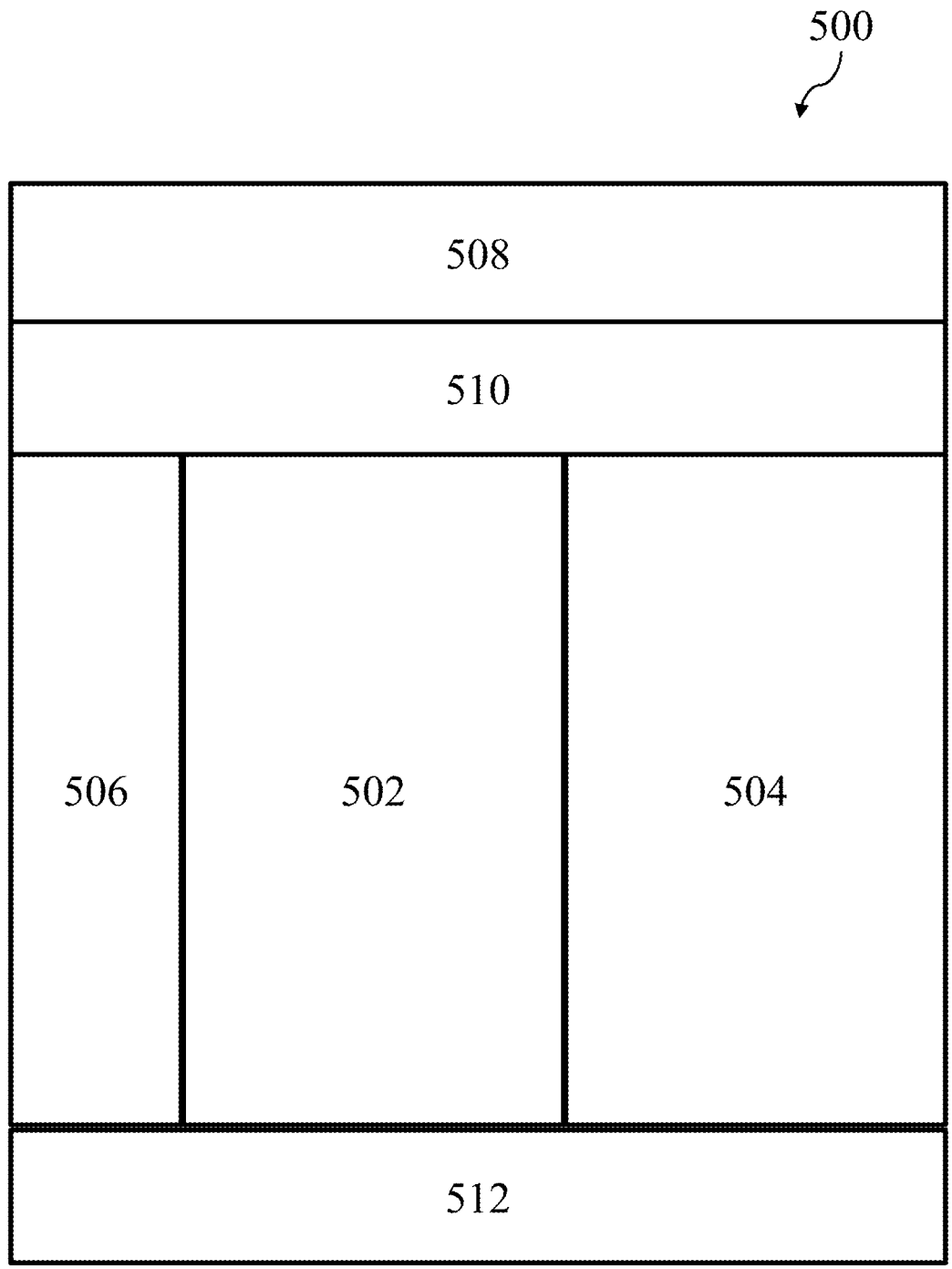
FIG. 5 shows a schematic diagram of the builder interface.

FIGS. 5-6 each show examples of an interface that may display synchronized datasets as described above. FIG. 5 shows a schematic diagram of a builder interface (500), comprising a print display (502) which displays text from the print dataset, a braille display (504) which displays visual braille from the braille dataset, and a style display (506) which displays descriptions from the style and structure dataset. When display of these datasets is synchronized, if the print display (502) is displaying lines 50-100, the braille display (504) will display braille corresponding to lines 50-100 of the print, and the style display (506) will display any style, organization, or type descriptions from lines 50-100 of the print. Synchronization may also be line-by-line, such that a first line of the print display (502) corresponds to a first line of the braille display (504), and any style or structure associated with those first lines will display in the first line of the style display (506). Such synchronization can be maintained by the builder interface (500) when scrolling through text (i.e., as the print display (502) is scrolled downwards or navigated through, the other displays will automatically update and maintain a line-to-line correspondence) and when input is received from a user modifying any section (e.g., where input is received in the print display (502) by a user placing a cursor there and then typing, the braille display (504) may be updated to show additional braille cells based upon the new text, and the style display (506) may be automatically updated to reflect any style or structure present in the new text).

With continued reference to FIG. 5, the builder interface (500) may also comprise a tools section (508) including a number of buttons, selections, or other interface features that may be interacted with by a user, a breadcrumb (510) which provides hierarchical information about the line or section of the print display (502) that a user is currently working in, and a work summary (512) which provides high level information about the work or project itself.

Information presented in the work summary (512) may include, for example, a page of the work that the print display (502) is currently displaying, a page of the work that the braille display (504) is currently displaying, a line position of the cursor (e.g., the row number at which the cursor is located, such that a document with 10 lines has rows 1-10), a cell position of the cursor (e.g., the column number at which the cursor is located, such that a document with a maximum of 40 characters per row has columns 1-40), and a style associated with the cursor's present position (e.g., whether the cursor is positioned within a list, a body text, a heading text). Such information may be useful because a braille version of a work will typically contain more pages than a print version of the same work, due to factors such as minimum size of a braille cell that will still provide meaningful tactile feedback, additional notations on style and organization in braille (e.g., additional braille cells may be required to indicate that a following word is bolded), and other factors. While the builder interface (102) can display the print dataset and braille dataset with a line-to-line correspondence, an embossed version of the braille work will not preserve such correspondence. Since transcribers may also insert formatting and organization to separate braille works into separate volumes (e.g., a braille work with 4,000 total pages may be separated into 40 volumes of 100 pages each), it may be advantageous to be able to readily determine a current page within the braille work. Information such as the association between a print page and a braille page may also be included as braille cells in a braille work, to aid students or others in finding a position within a braille version of a text based upon an oral instruction to proceed to a corresponding page in a print version.

As an example of information the breadcrumb (510) might display, a work might comprise three sections, each relating to a chapter in the book. The breadcrumb (510) might display that a user has placed a cursor in the first section, in a body text, in a sentence that has been bolded. This may be a useful way to present the hierarchical nature of information from the style display (506), since a style element such as bold may be contained within another style element such as body text or a list. Further, each portion of the breadcrumb (510) may be clicked on by a user in order to highlight, select, or navigate to that element of the breadcrumb, in one or of the print display (502), the braille display (504), or the style display (506). For example, when the cursor is placed on bold text within a body text as described above, clicking on the body text may cause that entire section of body text to be selected or highlighted.

Figure 6B:
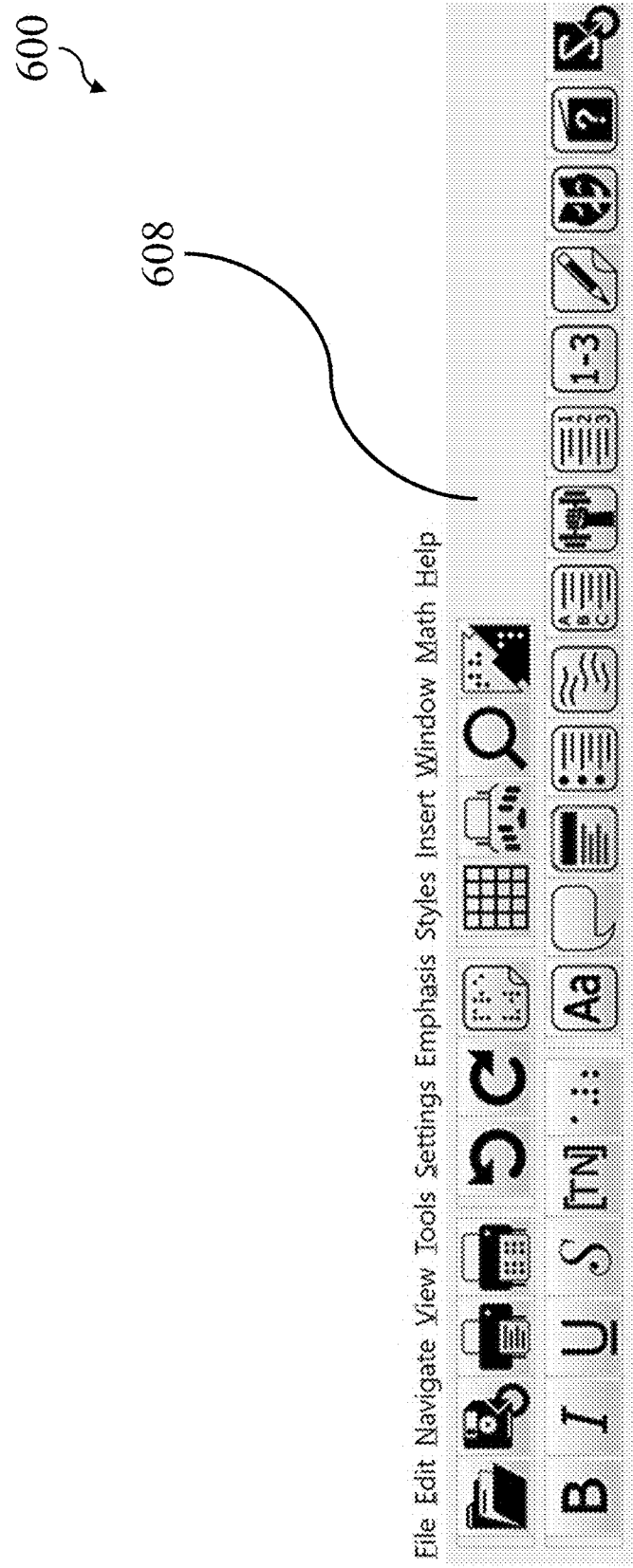
FIG. 6B shows a second screenshot of an exemplary implementations of the builder interface.

FIGS. 6A and 6B show screenshots of an exemplary interface (600) having features similar to that discussed above in the context of FIG. 5. For example, the interface (600) comprises a first section (602) similar to the print display (502), a second section (604) similar to the braille display (504), a third section (606) similar to the style display (506), and a fourth section (608) similar to the tools section (508). A breadcrumb (610), similar to the previously described breadcrumb (510), shows a hierarchical location of the cursor (i.e., within a first section and within a specific position of a list). Also shown is a work summary (612), similar to the previously described work summary (512).

Returning to FIG. 4, after displaying (402) and synchronizing one or more datasets, the system (10) may also provide one or more tools, features, or interfaces via the builder interface (102) to automate various transcription tasks. Such task automation may take various forms. To provide one example, in some implementations of the builder interface (102) users will work primarily within the print display (502) window, which shows portions of the print dataset, and which may be interacted with in a manner similar to a word processor, in that a user may move and relocate a cursor, and add, delete, and modify text. As such changes are made, the builder interface (102) may automatically update other datasets in the background, such as the braille dataset and the style dataset, and may also update the original source of the information (e.g., a NIMAS file set).

For example, where a NIMAS file set is the source of a project that is being edited, as a user modifies text within the print display (502) the working XML document (e.g., a .xml file type, a proprietary file type such as *.bbx) that has been created from the NIMAS XML may also be updated in real time, or from time to time, as the user saves the document. This allows a project to be maintained in a structured format that is transportable to other formats and platforms.

In this context, one advantage that may be provided by some embodiments is to allow a user to interact with buttons or interfaces to automatically build and inject such XML content without ever having to view or directly interact with the structured language. As one example, when transcribing manually, if a user wants to modify a NIMAS file set to indicate that the phrase "very important" has been emphasized with a bold font style, that user would have to modify the NIMAS file set to include an XML phrase such as: "<INLINE bb:type="EMPHASIS" bb:emphasis="BOLD">very important</INLINE>." Adding emphasis in that manner is a fairly simple example of the additional XML structure required by the NIMAS file set, and more complex examples can include building lists, glossaries, tables of content, and other structures. For example, Table 1 below shows an example of an XML structure that may be required to present a simple list with several items.

TABLE 1

Example NIMAS XML structure for a simple list

<list type="pl">
<li class="toc-entry"><p><strong>COLLECTION 1 Bold Actions</strong></p>
<list type="pl">
<li class="toc-entry"><p>ANCHOR TEXT<br/><strong>SHORT STORY</strong></p>
<p>Rogue Wave <span class="author">Theodore Taylor</span></p></li> <li class="toc-page"><p><a href="#p3">3</a></p></li>
<li class="toc-entry"><p><strong>Covering Issues in the News</strong></p></li> <li class="toc-page"><p><a href="#p19">19</ a></p></li>
<li class="toc-entry"><p>COMPARE MEDIA<br/><strong>ONLINE NEWS ARTICLE</strong></p>
<p>Parents of Rescued Teenage Sailor Abby Sunderland Accused of Risking Her Life <span class="author">Paul Harris</span></p></li> <li class="toc-page"><p><a href="#p19">19</ a></p></li>
<li class="toc-entry"><p><strong>EDITORIAL</strong></p>
<p>Ship of Fools <span class="author">Joanna Weiss</span></p></li> <li class="toc-page"><p><a href="#p24">24</a></p></li>
<li class="toc-entry"><p><strong>TV NEWS INTERVIEW</strong></p>
<p>Was Abby Too Young to Sail? <span class="author">CBS News</span></p></li> <li class = "toc-page"><p><a href="#p28">28</a></p></li>
<li class="toc-entry"><p>ANCHOR TEXT<br/><strong>GREEK MYTH</strong></p>
<p>The Flight of Icarus <span class="author">Sally Benson</span></p></li> <li class="toc-page"><p><a href="#p31">31</a></p></li>
<li class="toc-entry"><p><strong>POEM</strong></p>
<p>Icarus&#x0027;s Flight <span class="author">Stephen Dobyns</span></p></li> <li class="toc-page"><p><a href="#p39">39</a></p></li>
<li class="toc-entry"><p><strong>INFORMATIONAL WRITING</strong></p>
<p>Women in Aviation <span class="author">Patricia and Fredrick McKissack</span> <img id="NIMAS9780544087507-img-017" src="./images/thruout/play_icon.jpg" alt=""/></p></li>
<li class="toc-page"><p><a href="#p43">43</a></p></li>
</list></li>
<li><p><strong>COLLECTION PERFORMANCE TASKS</strong></p></li>

TABLE 1-continued

Example NIMAS XML structure for a simple list

```
<li class="toc-entry"><p>Write a Short Story</p></li> <li
class = "toc-page"><p><a href="#p53">53</a></p></li>
<li class="toc-entry"><p>Present an Oral Commentary</p></li>
<li class="toc-page"><p><a href="#p57">57</a></p></li>
</list>
```

As can be seen, manually encoding such an XML structure may be both time consuming and error prone, as failing to close a single bracket or object as required by the markup language can introduce errors into the structure that may be difficult to identify and correct when discovered. The builder interface (102) may simplify the creation of XML or other markup or encoding so that it occurs near invisibly to the user, who may instead interact with more familiar tools and interfaces to identify content that can then be automatically encoded into a structured form such as that shown in Table 1.

Returning to FIG. 4, to provide tools that may aid in the automatic transcription of content, the builder interface (102) may provide (404) a set of style tools. Style tools may be used to, for example, select or highlight existing text, or produce new text, having selected stylistic features such as bold, italics, underline, script, or other custom configured type forms. When activated, a style tool may cause the print display (502) to visually present the associated text in the selected style, may cause the braille display (504) to add braille cells indicating that the associated text is presented with that style, and may cause the style display (506), breadcrumb (510), or other areas to indicate that the associated words or lines are associated with that style. Additionally, the system (10) may also update the original source data, a proprietary project output file associated with the builder interface (102), or both, to inject preformed XML structures reflecting the change in style as a result of the use of the tool.

While each tool has a specific function and use, the effects of each tool will be generally as described above in relation to providing (404) the set of style tools. More particularly, tools will generally receive input from a user (e.g., a single click, or in some cases, a set of input content or data, as will be described in more detail below), automatically update one or more of the print display (502), the braille display (504), and the style display (506), and automatically create and insert encoded data (e.g., XML or other structured data) as has been described.

With the context of the general function of a tool in mind, the builder interface (102) may also provide (406) a set of structure tools. Structure tools may be used to automate the organization of content into lists (e.g., as shown in Table 1), position content on a page (e.g., centered, justified), organize content into tables having multiple rows and columns, indicate that certain text is a body, header, footer, or other text, for example.

The builder interface (102) may also provide (408) a set of type tools. Transcription of printed text works into braille requires a complex set of braille annotations in order to capture the nuances present in some texts. One or more of the set of type tools may be usable to select and associate text with desired types, and generate the proper braille annotations. For example, a science textbook may have a primary text body containing explanations of a subject matter, with an offset box containing a practice example or problem related to the subject matter. The offset box may be visually designed using colors, placement, or other factors to indicate to a visually reading student that it is an optional exercise section. Standardized braille formatting rules provide guidance for identifying such text as exercises. Other specific types provided include, for example, indicating that a section of text is associated with poetry, a play, including sub-annotations for text associated with prose, verses, or stage directions, attributions, and citations.

The builder interface (102) may also provide (410) a set of note tools. The note tools may be used to generate braille annotations indicating that associated text is a transcriber's note, production note, or other type of note. In some embodiments, text added to the work that is not shown in the print text, and is instead added by transcriber will preferably be marked as a transcriber's note. Transcriber notes often provide information to a braille reader that is not readily apparent from the text alone. For example, in a text where an ongoing sentence or paragraph ends on one page, and the following page is mostly or entirely dedicated to material that does not complete the sentence or paragraph (e.g., an image, a chart, a table of data) a transcriber's note may be inserted at the point of interruption, and at the point where the narrative continues, indicating the presence of interrupting material in between. As another example, when particular braille standards and rules are applied when transcribing a text (e.g., where mathematical concepts might be presented in braille using one of several standards), a transcriber's note may be inserted identifying the rules or standards that were applied. In this manner, a braille reader may read the transcriber's note and avoid later confusion when information is presented in an unexpected format. As yet another example, where an image may be necessary to understand the text but is too complex to be produced as a tactile graphic, a description may be provided inside transcriber's note indicators.

Figure 9:
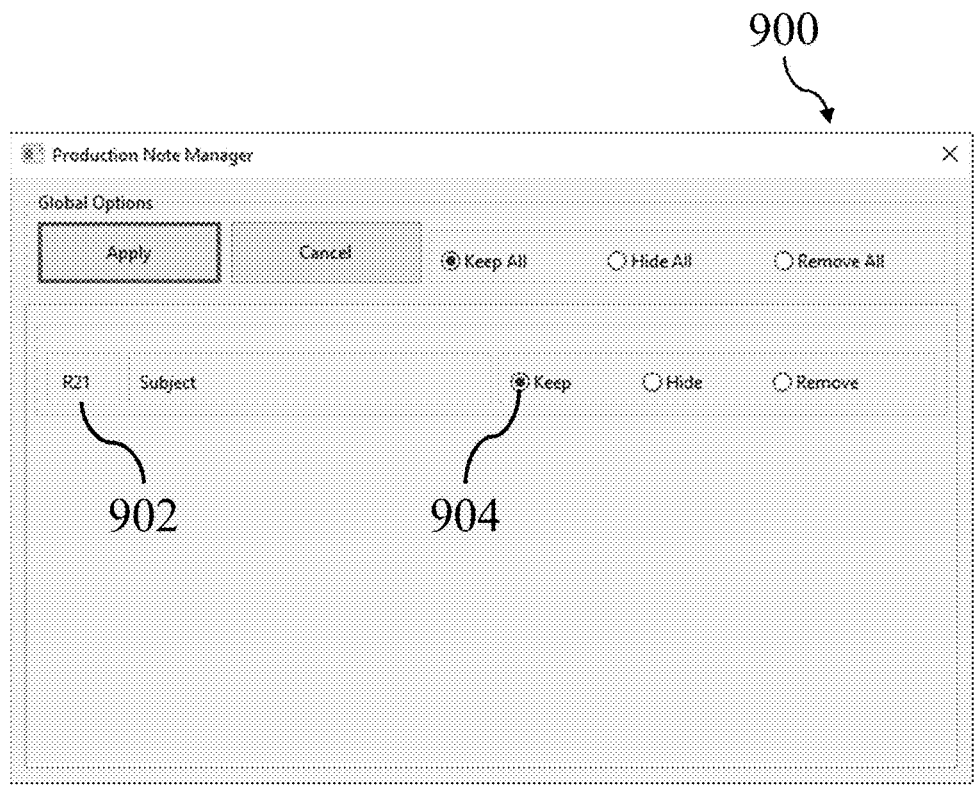
FIG. 9 shows a screenshot of an exemplary notes interface.

Another type of note that may be added with the set of note tools is a production note. Production notes may be associated with certain text, and may provide information relating to production of the work as a physical braille copy. Typically, production notes will be removed and not replicated into the produced copy. For example, a production note may indicate that an image spans to a subsequent page, or may capture other factors that may aid someone responsible for producing and assembling an embossed copy of the work. As a result, in some embodiments production notes may only be present on the print display (502), but in some cases may also be preserved and displayed in the braille display (504) and produced copy, where useful. FIG. 9 shows an example of a production note interface (900), which comprises a set of notes (902) and a set of note controls (904). The set of notes (902) may display the contents and locations of one or more notes that have been associated with the transcribed work, and the set of note controls (904) may be used by a transcriber to review each note and then cause it to be kept (e.g., displayed in both the print version and braille version), hidden (e.g., removed from the print and braille version but preserved in the dialog in case needed later), or removed (e.g., deleted from both the braille version and the print version, and from the project entirely).

The builder interface (102) may also provide (412) a set of math tools. The set of math tools may be used to generate and insert formatted braille content for complex mathematical equations, formulas, notations, and symbols. Typically, input files such as NIMAS will not contain sufficient data for converting mathematical data into braille, and such formulas may instead be included as an image of an equation that cannot be converted into braille formats automatically. As a result, mathematical data is an area of a transcription project that must frequently be manually transcribed based upon review of a physical copy of the text or an image. The set of math tools may be used to build formatted braille for mathematical formulas, equations, algorithms, and other operations. For example, one math tool may receive input in a standard mathematical notation or markup language such as AsciiMath. The tool may convert the markup language and insert it as a readable format for display in the print display (502), and as a braille format for display in the braille display (504).

The set of math tools may also include formula building tools that include clickable buttons for automatically inserting symbols from various categories. For example, clickable buttons may be provided for inserting operation symbols, relation symbols, Greek symbols, logic symbols, grouping symbols, function symbols, and other symbols as are customarily required for fully displaying mathematical concepts. Use of formula building buttons may advantageously allow a transcriber to transcribe math data without familiarizing themselves with AsciiMath or another markup language.

While transcribing mathematical data is already a difficult task for transcribers, it is further complicated by the use of multiple different standards for representing mathematics in braille, with different states, countries, regions, or organizations requiring or preferring a particular standard over any other. Using conventional tools, this has led to transcribers producing braille versions of mathematical data in only one standard (e.g., a transcriber in Ohio may only include the standard used by Ohio), or producing the work in two or more standards by completing the same work multiple times (once for each braille standard needed). By using the provided (412) math tools, the mathematical data can be input once and stored in a standardized format (e.g., AsciiMath), which can then later be automatically converted into any desired braille mathematics format. This reduces the time spent on transcribing the mathematical formula into each different braille mathematics format, and also allows the transcriber to produce embosser output files for different states by selecting the desired format, and causing the system to automatically convert the associated text into that format.

Figure 7:
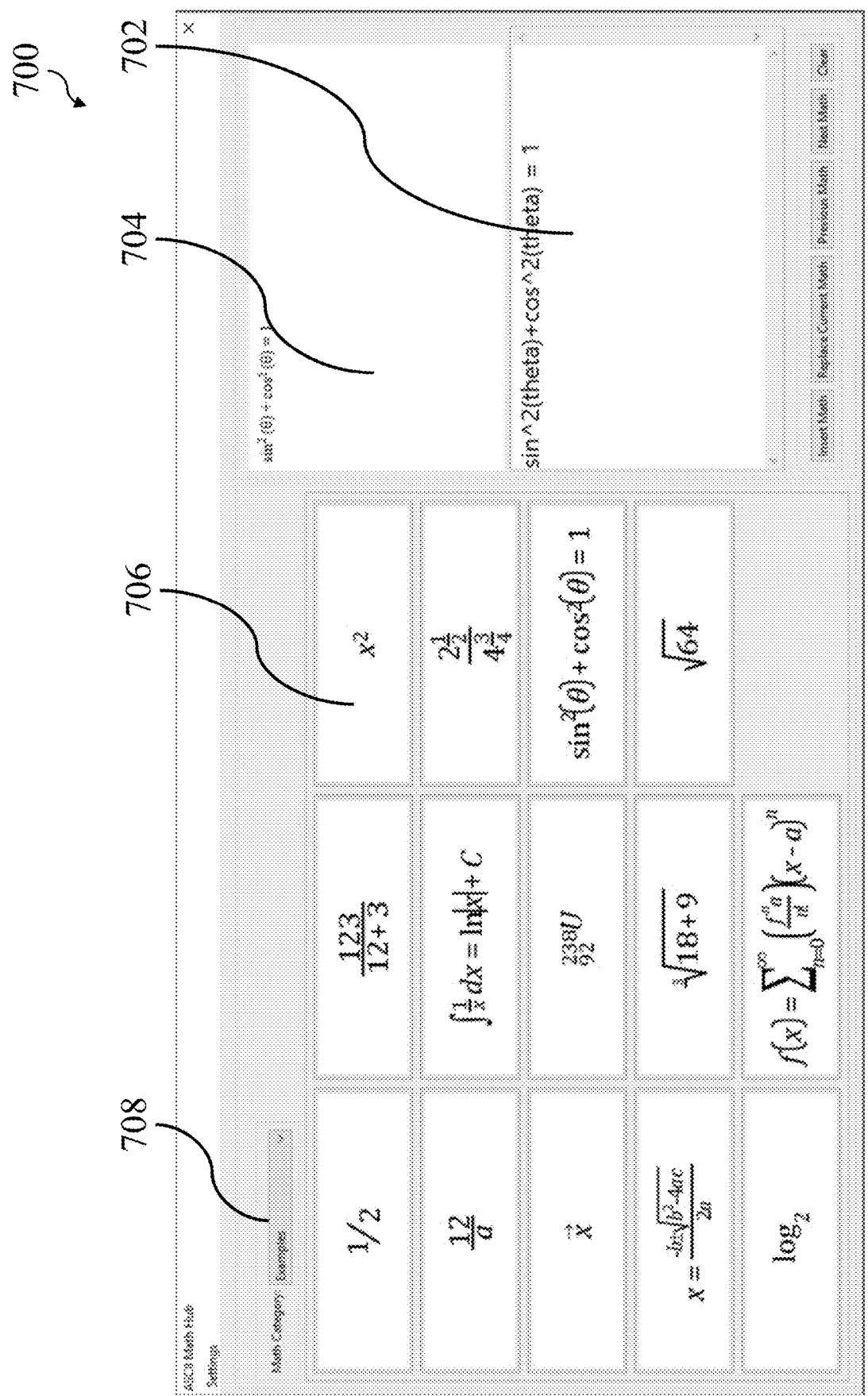
FIG. 7 shows a screenshot of an exemplary math interface.

As one example of a math tool, FIG. 7 shows a formula builder interface (700) that may be operable by a user to describe mathematical concepts during transcription. The formula builder interface (700) comprises an input box (702) that a user can type within using a standard mathematical markup language (e.g., AsciiMath) and a display box (704) which visually renders the resulting mathematical formula as it might appear in an original textbook or other work. The interface (700) also comprises a category selector (708) usable to browse categories of symbols (e.g., operators, comparators, Greek symbols), and cause a set of buttons (706) to appear from the selected category. The set of buttons (706) may display a visual rendering of symbols, equations, and other math data, and may be clicked to cause the input box (702) to be updated to include text associated with the clicked button (e.g., clicking a button with "sin²" may cause the AsciiMath markup "sin^2" to be inserted into the input box (702)). The visual rendering uses a library for rendering math, which is accessible to most screen readers so that users that are blind can benefit from the feature.

As another example of a math tool, FIGS. 13A-13E each show interfaces that may be used to transcribe mathematical information in a non-linear way, in order to preserve spatial considerations relating to the mathematical content. For example, while many mathematical functions may be expressed on a single line (e.g., 100+10+1=111), mathematical textbooks may for instruction purposes space such functions out across several vertical rows. A spatial editor (1300) may be used to enter contents into a content input (1302) that is associated with a particular spatial expression and organization by row or column, and a set of navigation buttons (1304) may be interacted with to associate the content input (1302) with a desired column and row on a page. This may be useful because mathematical data is often distributed across a page in a print work, such that there may be multiple math problems laid out, each in their own column, horizontally across a page. Similarly, a print work may have multiple rows of math problems laid out vertically on a page. In order to provide a similar experience in a braille version of the work, any of the interfaces shown in FIGS. 13A-13E may include controls such as the set of navigation buttons (1304), which may be used to control the number and contents of each row and column of the braille page.

For example, the spatial editor (1300) may be used to enter text and numbers which may be separately and horizontally spaced across a page by adding additional columns (e.g., by clicking "Next" in the column section of the buttons (1304)), or may be separately and vertically spaced across a page by adding additional rows (e.g., by clicking "Next" in the row section of the buttons (1304)). In the example shown in 13A, there is only a single row and a single column, resulting in a single text input that may be entered into the content input (1302) and inserted into the work. If, for example, two additional columns and two additional rows were added using the set of navigation buttons (1304), there would be three rows, each having three columns, for a total of nine different text inputs that may be entered in the content input (1302) and inserted into the work.

Once the spatial math object has been built by the transcriptionist, it may be inserted at the cursor location in the print display (502) and at the corresponding location within the braille display (504). When inserted, the nine different texts would be horizontally presented in three separate columns, and vertically presented in three separate rows, with spaces or braille cell indicators, such that a braille reader would understand that the nine different inputs were organized by row and column rather than being a single block of continuous text, such that a braille reader could read an entire column of mathematical data spanning across several different rows without being confused by data in surrounding columns. Each of the interfaces of FIGS. 13A-13E may also provide a warning to a user when input is entered, or when entered input is inserted into a braille work if there is not enough space on a certain page or line of the braille work. For example, where the spatial editor is used to enter 10 columns of input, and each column contains input equivalent to four braille cells, the resulting braille output that is inserted may be 49 cells wide (e.g., 10 columns of four cells each, and one blank cell separating each column). If the braille work receiving the input is limited to 40 cells in a single row, an error may be provided indicating that the user must reduce the number of cells in the row or split the row onto multiple lines.

Figure 13A:
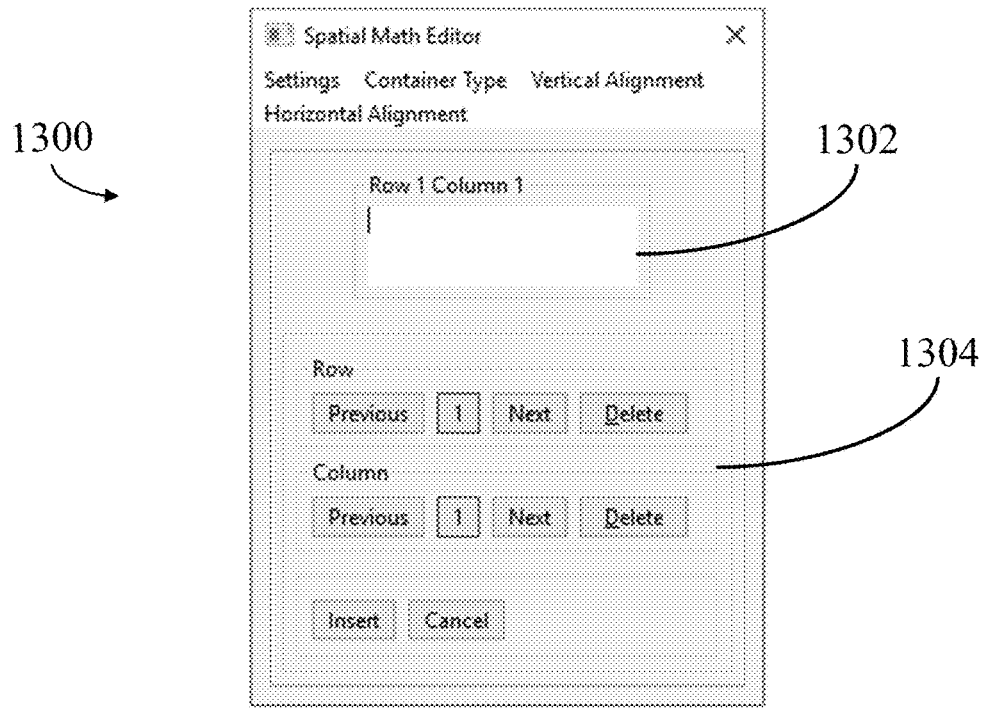
FIG. 13A shows a screenshot of an exemplary spatial math interface.
Figure 13B:
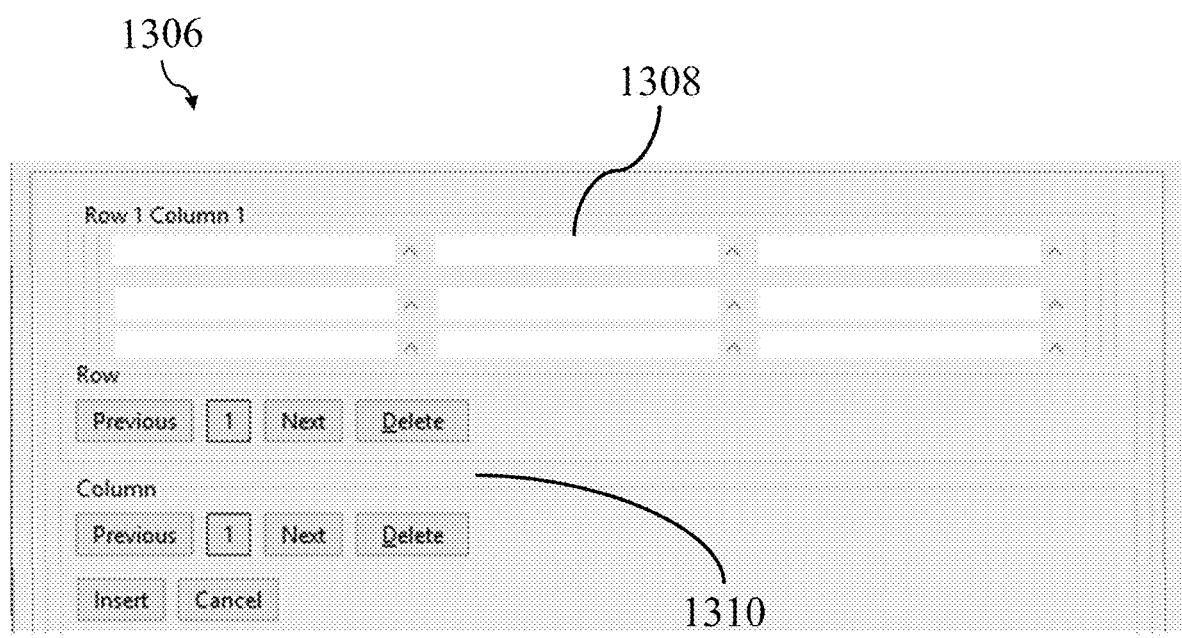
FIG. 13B shows a screenshot of an exemplary matrices interface.

FIG. 13B shows another version of a matrix editor (1306), which comprises a set of content inputs (1308) associated with a particular row and column, and set of navigation buttons (1310) that may be used navigate to a desired row and column (e.g., as described above, where multiple separate matrices may be inserted in columns and rows on a page). The matrix editor (1306) may be useful for creating larger spatial math equations or inserting matrices of varying types (e.g., while a 3×3 matrix input (1308) is shown, this number may be adjusted as desired), which may then be inserted into the print display (502) at the cursor location and at the corresponding location within the braille display (504).

Table 2 shows an example of the utility of the spatial math editors of FIGS. 13A and 13B. The first row of Table 2 shows single line content that may provided as input, and may also be used as output to be displayed on the print display (502) automatically converted to braille (e.g., using LibLouis). The second row of Table 2 shows a spatial or multi line equation that may be input using a spatial math tool, and output that may be displayed on the print display (502) automatically converted to braille in a manner that preserved the multi-line, spatial aspects. As can be seen by a comparison of rows 1 and 2 in Table 2, mathematical data that includes spatial characteristics such as that shown in row 2 may be displayed differently in the print display (502) and braille display (504), in order to represent those spatial characteristics and spatial layout, as compared to a single line input as shown in row 1.

TABLE 2

Exemplary spatial math inputs and outputs

| Row | Input | Output to Print Display |
| --- | --- | --- |
| 1 | 100 + 11 | 100 + 11 |
| 2 | 100 + 11 | #ajj<br>"6#aa<br>"333 |
| 3 | 100 × 11 | #ajj<br>"8#aa<br>"333 |
| 4 | 100/10 | #aj_#ajj |
| 5 | 1⅕ + 1⅕ | #a#a/e<br>"8#a#d/e<br>"33333 |
| 6 | Interval 1<br>Line 1, 5<br>Segment 2, 3 | "333<br>\|{"3w33w33w33w33w3\|o<br>#a#b#c#d#e |

Figure 13C:
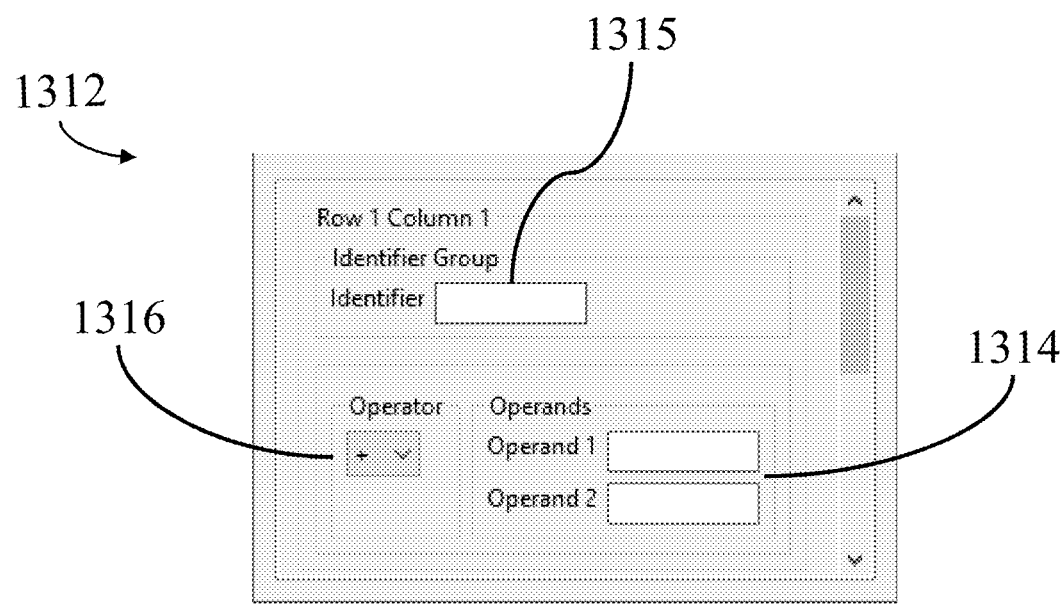
FIG. 13C shows a screenshot of an exemplary math template interface.
Figure 13D:
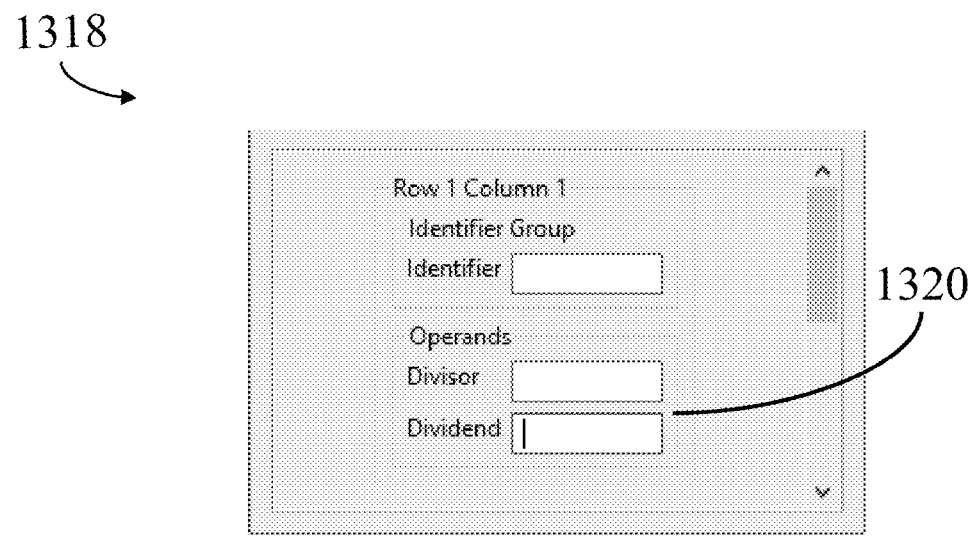
FIG. 13D shows a screenshot of an exemplary division interface.

FIGS. 13C and 13D each show math editing interfaces that may be used to create spatial math entries such as those shown in Table 2. FIG. 13C is a math template interface (1312) including a set of operand inputs (1314) and an operator selector (1316) that may be used to select addition, subtraction, and multiplication operators to apply to the operands. An identifier input (1315) may be used to provide an identifier or other text to associate with an equation (e.g., where problems in a print text are labeled Problem 1, Problem 2, or another label). With reference to Table 2, row 3 shows input that may be provided using the template interface (1312) and corresponding output that may be displayed on the print display (502) and automatically converted to braille while preserving spatial aspects. Similarly, FIG. 13D shows a division interface (1318) including a set of division inputs (1320) that may be used to define a divisor. With reference to Table 2, row 4 shows input that may be provided using the division interface (138) and corresponding output that may be displayed on the print display (502) and automatically converted to braille while preserving spatial aspects.

Figure 13E:
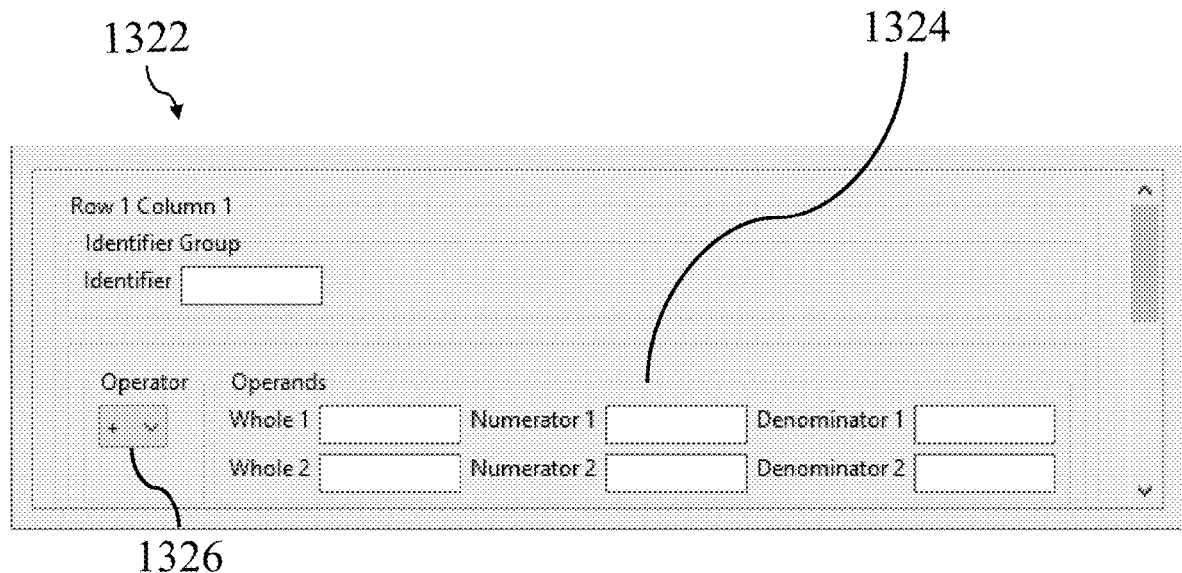
FIG. 13E shows a screenshot of an exemplary fraction interface.

FIG. 13E shows a fraction interface (1322) that includes a set of fraction inputs (1324) and an operator selector (1326) that may be used to display fractional mathematical concepts while preserving spatial information. With reference to table 2, row 5 shows input that may be provided using an interface such as the fraction interface (1322) and corresponding output that may be displayed on the print display (502) and automatically converted to braille while preserving spatial aspects.

Figure 14:
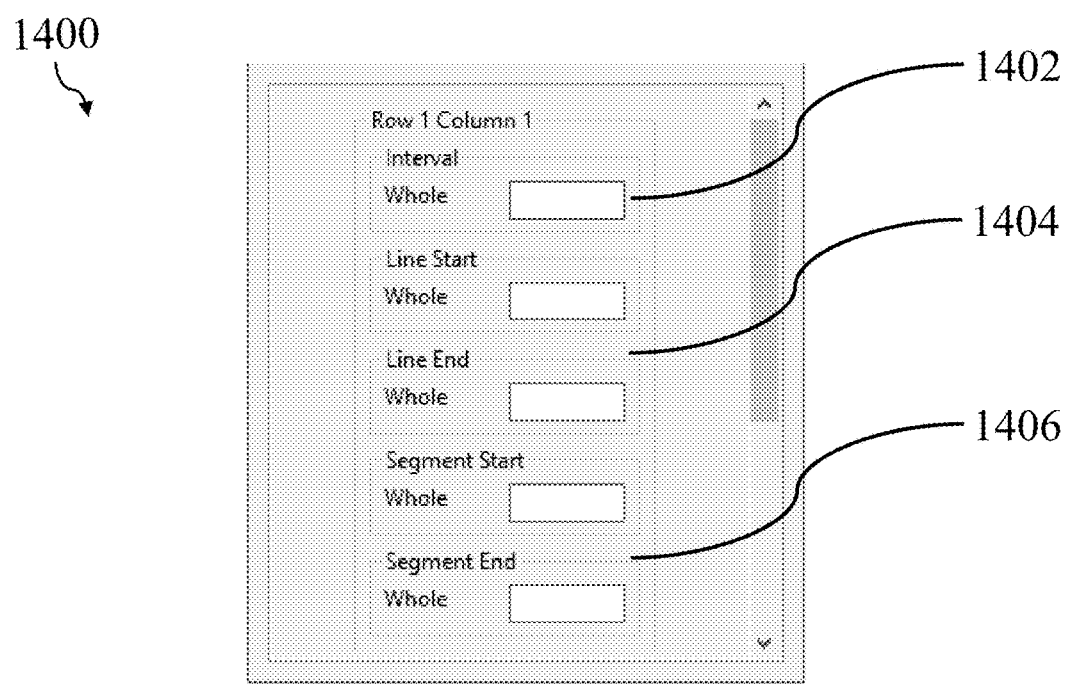
FIG. 14 shows a screenshot of an exemplary number line interface.

FIG. 14 shows an additional example of a math tool, a number line interface (1400), which includes an interval input (1402), usable to define an interval displayed by the number line (e.g., intervals of 0.25, 0.5, 1, 10), a set of line inputs (1404) usable to define the total length of the number line, and a set of segment inputs (1406) usable to define a particular relevant segment of the line. Number lines are another common visual indicator in a text book, which must be thoughtfully presented in braille in order to provide the braille reader the best chance for understanding the content. Number lines may include important contextual information, such as an interval, labels, or other information. With reference to Table 2, row 6 shows an example of inputs that may be provided using an interface such as the number line interface (1400) and corresponding output that may be displayed on the print display (502) and automatically converted to braille while preserving spatial aspects. As can be seen, based upon the inputs the builder interface (102) determines the complete layout of the number line and builds it in an appropriate format for display via the print display (502), which can then be automatically converted for display via the braille display (504). The number line interface (1400) may also be used to associate text with a number line (e.g., replacing a label at the value 1 on a number line with the text 'start').

Additional math tools provided (412) individually or with one or more of the example tools above may include, for example, tools aiding in the inclusion of various braille specific symbols such as Nemeth indicators, which indicate to a braille reader that subsequent text is a math block, numeric passage mode indicators, which indicate to a braille reader that subsequent text is numeric and will omit repetitive cells that indicate a following number, and math identifiers which may be used to associate the mathematical concept with an identifier (e.g., Problem 1, Problem 2, etc.) to aid in a braille reader locating and differentiating between problems. It should be noted that any of the tools disclosed above may be configured to receive inputs as whole numbers, decimal numbers, fractions, or other forms.

The builder interface (102) may also provide (414) a six-key tool or interface. A physical braille keyboard has six keys, with each key corresponding to a different dot of a six-dot braille cell. Some transcribers prefer to work with a six-key input scheme for certain transcription tasks. In such a case, the six-key tool may be used by a transcriber to receive inputs from a standard keyboard and interpret them as input from a six-key braille keyboard, allowing the user to input braille directly, which may then be displayed as braille in the braille display, and as print within the contents of the print display (502). The six-key tool functions as a virtual braille keyboard, receiving simultaneous keystrokes from a standard keyboard and assigning them to dots in a particular cell. For example, with reference to a standard keyboard, each of the keys for F, D, S, J, K, and L may be assigned to a single dot in a braille cell. Simultaneously pressing each of the six keys will result in the creation of a braille cell with six dots, while pressing subsets of keys will produce braille cells with dots appropriately placed based upon the keys pressed. In this manner, one or more of the six assigned keys can be simultaneously pressed in various combinations to produce any of the 64 different possible braille cell configurations.

Figure 8:
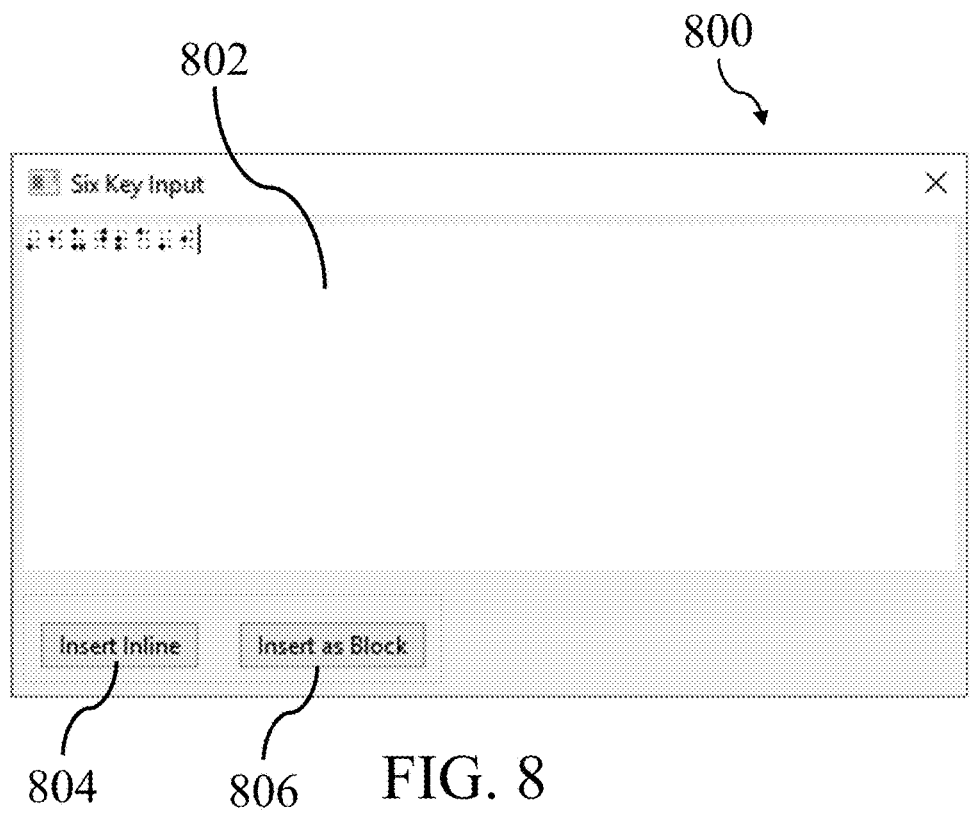
FIG. 8 shows a screenshot of an exemplary six-key interface.

As an example, FIG. 8 shows an example of a six-key interface (800), which comprises a braille viewer (802) that displays braille cells and dots as the user types and provides input through the virtual braille keyboard, and buttons for an inline insert (804), which may be selected to insert the braille shown in the braille viewer (802) at the cursor in the print display (502), and a block insert (806), which may be selected to insert the braille into the work as its own paragraph. The six-key interface (800) may be used by a transcriber inputting braille cells using the virtualized interface (e.g., where a set of keys from a standard keyboard are mapped to each of six keys) to create braille in the braille viewer (802), and then add it in one or more ways to the braille display (504), as braille, and to the print display (502), as print. Varying implementations may implement an interface such as the six-key interface (800) to enable typing braille directly into the braille display (504), typing in braille to enter print content directly in the print display (502), typing in braille to a temporary window which may be viewed and inserted into another display, or all of the above.

The builder interface (102) may also provide (416) a set of volume management tools. Braille standards specify certain rules for dividing works into volumes, as well as braille information that must be present on each volume (e.g., braille on a cover, binding, first page, or last page of a volume indicating the volumes relation to the work as a whole) in order to assist braille readers in navigation between volumes without confusion. Such requirements may include specifying volume types, inserting title pages or transcriber pages describing the volume, tables of contents, and end of volume statements. Conventionally, volume management is performed manually across the work, and requires a transcriber to manually enter required volume information in each associated location (e.g., the start of each volume, end of each volume). With a table of contents and other information changing over time as a work is transcribed, this can be repetitive and error prone. In some embodiments, volume management tools may be used to insert and view volume data across the entire work, and may also allow the transcriber to copy volume information from one volume to a subsequent volume, for example.

The builder interface (102) may also provide (418) a set of symbol tools. The set of symbol tools may be used to track and identify special symbols within the text, which may particularly require the transcriber's attention during transcription, since the special characters are not common and may not be known to the reader. The set of symbol tools includes a default list of symbols and rules for finding those symbols. The rules are necessary so that one symbol does not get confused for another. The set of symbol tools may allow the transcriber to configure rules for searching the work for special characters, and then may search and display potential instances of use of the special character in their full context so that the transcriber may verify. For example, this may include identifying copyright symbols, ampersand symbols, bullet points, and other symbols within the text. Alternately, if a search returns more results than are useful, the transcriber may configure new rules to filter out results that they are comfortable are not mistaken.

Figures 10, 11:
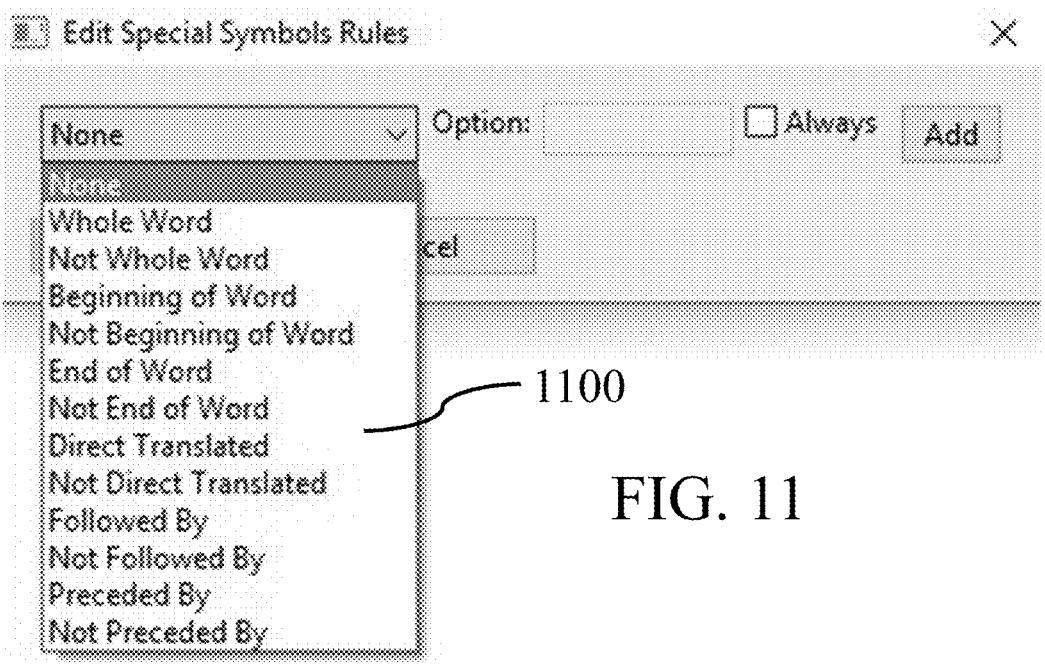
FIG. 10 shows a screenshot of an exemplary special braille symbol interface.
FIG. 11 shows a screenshot of an exemplary rules interface.

FIGS. 10 and 11 show examples of a symbol interface (1000), which comprises a set of symbols (1002) that have been defined by the transcriber or software, a set of descriptions (1004) for each symbol, a set of rules (1006) for determining how each symbol is identified within the work during a search, and a rule selector (1100) usable to add rules to the set of rules (1006). Examples of rules that may be used when searching for special symbols, in order to broaden or tighten the parameters of the search, include:

Whole Word: This means that the symbol needs to have a space before and after it, standing on its own, for it to be listed by a symbol search.

Not Whole Word: Listed by a symbol search only if it is not standing on its own, or is partially connected to another symbol.

Beginning of Word: Listed by a symbol search only if it appears at the beginning of a word.

Not Beginning of Word: Listed by a symbol search if it appears anywhere except at the beginning of a word.

End of Word: Listed by a symbol search only if it appears at the end of a word.

Not End of Word: Listed by a symbol search if it appears anywhere except at the end of a word.

Direct Translated: Listed by a symbol search only when the symbol is manually translated by the transcriptionist (e.g., where automatic conversion from print to braille must be overridden to cause the symbol to be correctly communicated, using the override tools included in the program).

Not Direct Translated: Listed by a symbol search only when the symbol is not manually translated by the transcriptionist.

Followed By: Listed by a symbol search only if this word is followed by a specified character, word, or other text.

Not Followed By: Listed by a symbol search only if the word is not followed by a specified character, word, or other text.

Preceded By: Listed by a symbol search only if this word is preceded by a specified character, word, or other text.

Not Preceded By: Listed by a symbol search only if this word is not preceded by a specified word, character, or other text.

The builder interface (102) may also provide (420) a correction tool that may be used to note errors or other undesirable results in the way that the builder interface (102) has converted the input data (e.g., data from a NIMAS file set) into braille. For example, in some cases input may contain Unicode characters (i.e., Unicode: U+25B6), proper nouns, and non-English words, that the builder interface (102) may not recognize by default and so may mistranslate for the transcriptionist's desired purposes. The correction tools may be used by the transcriber, when a translation error is identified, in order to correct that error across the entire work. Additionally, such identified errors may be provided to the transcription server (108) to be used in addressing future instances of the error, whether caused by a fault of the builder interface (102) or by an error in the input files or NIMAS file set, for example.

The builder interface (102) may also provide (422) a table of contents tool. The table of contents tool may be used to automatically build braille formatted annotations to position a table of contents across multiple volumes of a work, as each volume is produced, while maintaining the requirements of braille formatting rules like the Braille Authority of North America Braille Formats 2016. Such rules may include automatic division of table of contents across volumes, entry and formatting of table of contents braille notations, defining table of content headings that should be repeated in appropriate volumes, adding guide dots and guide cells to indicate whether numbers in table of contents are page numbers or other numbers, automatically dividing table of contents by volumes, and other similar functions.

The builder interface (102) may also provide (424) an image tool. The image tool may be used to browse, view, and generate braille format text describing images included in a work (e.g., images included in a NIMAS file set, or images present in a physical print copy). Transcription of images is a significant portion of a transcription project, as print copies frequently do not include text or other descriptions with images that fully describe them. As a result, a transcriptionist must add descriptions for some images that may be pertinent to the understanding of the text, which must be included in the braille version of the work with notations and formatting indicating that it is a description of an image in the print version. The builder interface (102) may include other tools and features performing similar functions as described above, including providing single click functions or simple interface functions to create and insert formatted text, braille cells, and encoded data (e.g., XML or other markup language) into the working datasets of a transcription project.

Figure 12:
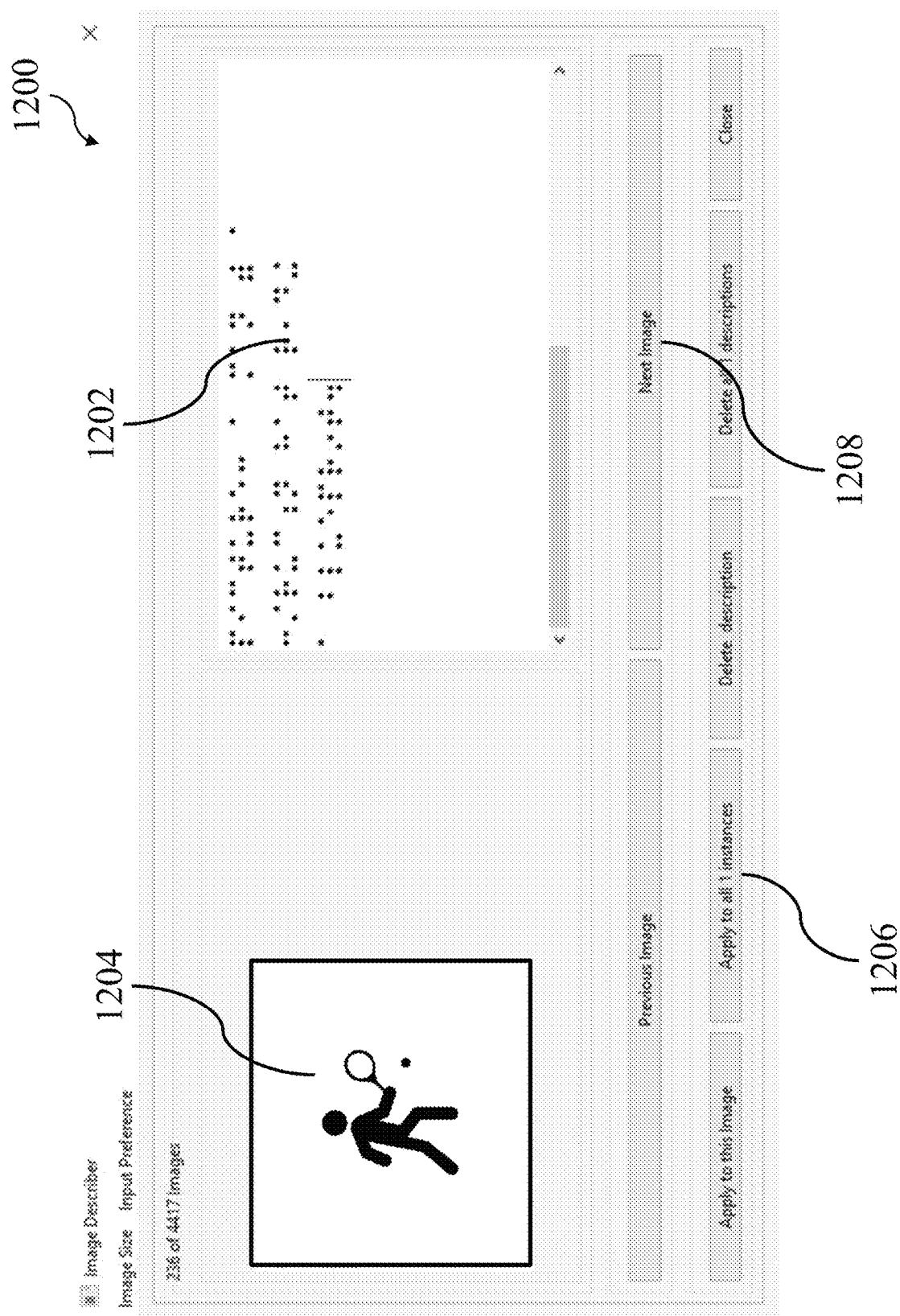
FIG. 12 shows a screenshot of an exemplary image interface.

FIG. 12 shows an example of an image interface (1200), which includes a description input (1202), an image viewer (1204), a set of image navigation buttons (1208), and a set of image update buttons (1206). The description input (1202) can receive input from a transcriber in print or in braille (e.g., via a virtual six-key interface), and the image viewer (1204) display an image that the input text will be associated with. This is advantageous for a transcriber since they can view the image viewer (1204) while they input associated text in the description input (1202) in the same image interface (1200) window, rather than having to refer between multiple sources (e.g., referring to a physical copy while typing in an interface, or referring to a first interface while typing in a second interface), which may reduce the number of erroneous associations between descriptions and images.

The image interface (1200) also allows a transcriber to navigate through all images associated with a work by using the set of navigation buttons (1208) to, for example, proceed to a next image, or return to a prior image. Navigating images from such an interface provides advantages over scanning through the entirety of a work (e.g., scrolling through the print display (502)) and manually searching for text indicating the presence of an image. The image interface (1200) also allows a transcriber to update images in various ways using the set of image update buttons (1206). This may allow a transcriber to add a description to a single image (e.g., associate the description shown in description input (1202) with the image shown in the image viewer (1204)), or may allow for a single description to be associated with multiple images.

For example, if a particular textbook uses an image of a glowing light bulb to highlight important portions of the text, there may be hundreds or even thousands of occurrences of that image. The image interface (1200) may determine (e.g., based upon the contents of a NIMAS file) the number of occurrences of the image shown in the image viewer (1204), and allow the transcriber to associate a description with each occurrence of that image with a single click. Descriptions that are entered and associated with images may include textual descriptions (e.g., for a lightbulb, "lightbulb", for a magnifying glass, "magnifying glass"), but may also include abbreviate icon descriptions, which may be either standard icons or may be defined for a particular work using an icon key. For example, for frequently used icons such as a lightbulb or magnifying glass, rather than providing a lengthy set of braille cells to spell out the entire word, a transcriber may instead provide an icon description (e.g., as text symbols, as braille via a six-key interface, or selected form a list) which may indicate to a reader that an image is a lightbulb with only two braille cells.

Figure 4:
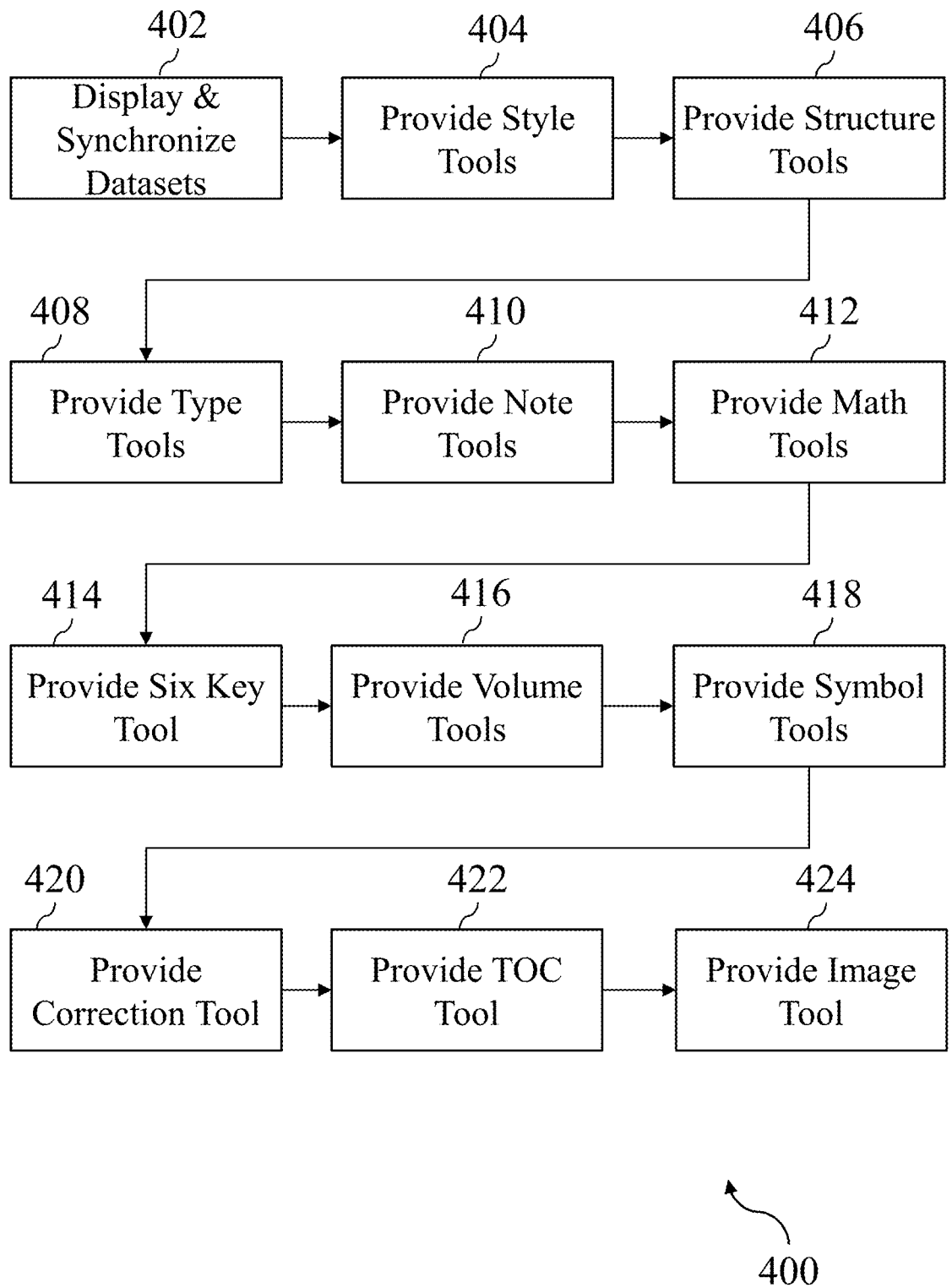
FIG. 4 shows a set of exemplary steps that may be performed to provide features of an exemplary builder interface.
Figure 15:
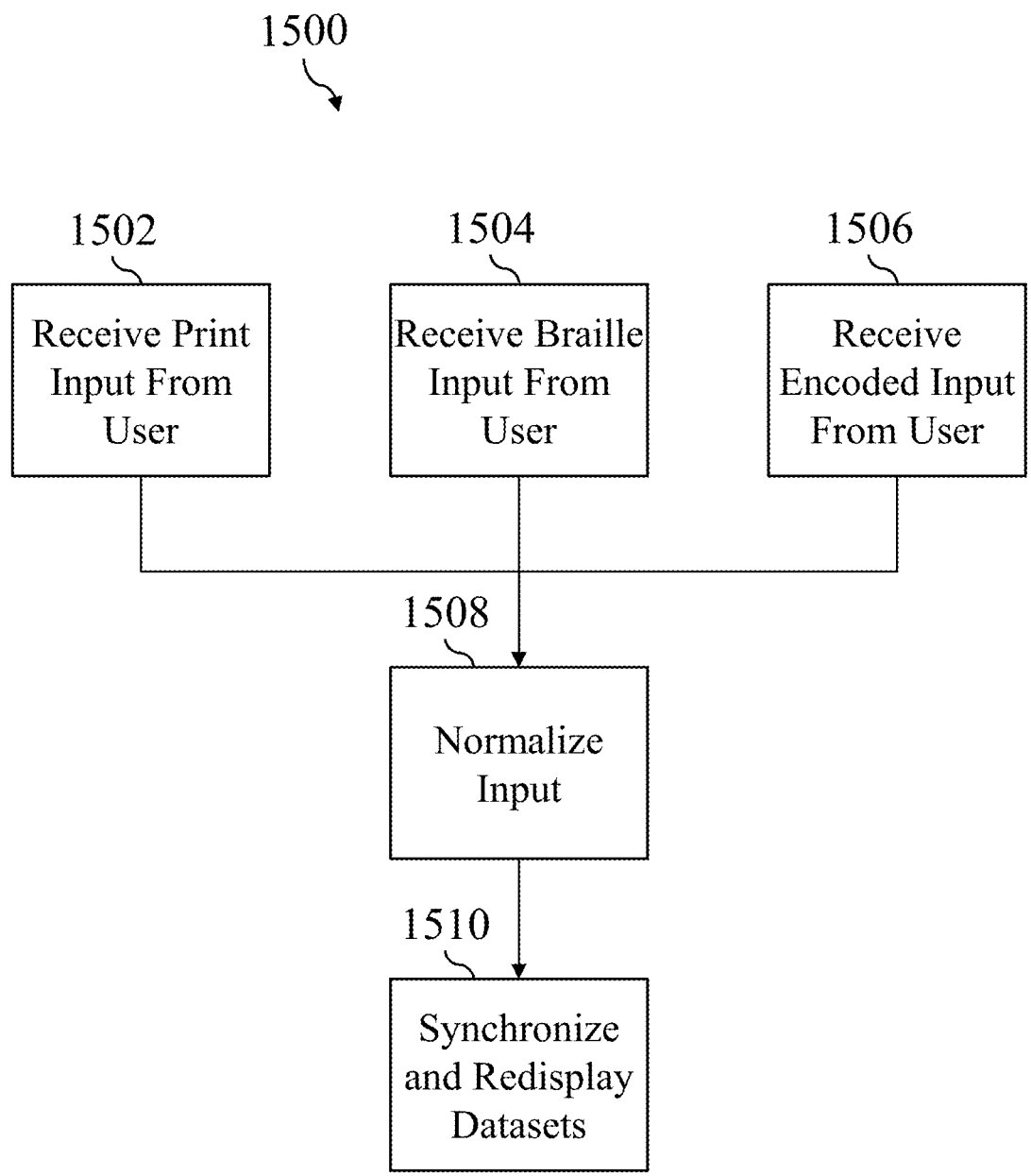
FIG. 15 shows a set of exemplary steps that may be performed to receive input via the builder interface.

While it has been described in some detail in relation to the builder interface (102) itself as well as the steps and features of FIG. 4, it should be understood that the builder interface (102) performs numerous automatic transcription tasks when used by a transcriptionist. For example, FIG. 15 shows a set of exemplary steps (1500) that may be performed to build a braille dataset that may be suitable for use with a device such as the embosser (106). As has been described, input may be received from the user via the builder interface (500) in various ways. For example, input may be received (1502) as print input typed by a user into the print display (502), or may be received (1504) as braille input typed by a user into the braille display (504) (e.g., using a virtual six-key interface to type directly within the braille display (504), or to prepare and insert cells into the braille display (504)). Input may also be received (1506) as encoded input, which may include receiving typed XML structures from a transcriptionist, which may be useful for transcriptionists that are familiar with XML programming and desire more control over the display of a particular section of braille content than a particular implementation of the builder interface (500) provides.

Regardless of the form or source of input that is received, the builder interface (102) may normalize (1508) that input into a standard format as part of synchronizing (1510) and redisplaying each of the impacted datasets, since any received input may impact one or more of the datasets shown in the print display (502), the braille display (504), the style display (506), and in some cases the underlying encoded dataset, such as XML structured contained within a NIMAS file set.

In some implementations, normalizing (1508) input may include receiving (1502) input via the print display (502), converting the input into XML structure such as a *.bbx file type (e.g., or *.bbz, NIMAS, or other), updating the underlying project data (e.g., a *.bbx file, *.bbz file, a NIMAS file received (302) at the start of the project), then synchronizing (1510) and rebuilding the datasets that display in each of the print display (502), the braille display (504), and the style display (506).

In other implementations, normalizing (1508) may include receiving (1502) input via the print display (502), updating the print dataset, synchronizing (1510) and rebuilding the braille dataset and style and structure dataset based upon the print dataset, and then updating the underlying project data (e.g., a *.bbx file, *.bbz file, a NIMAS file, an embossing device input file) only when the transcriptionist saves or commits their work.

In some implementations, input may only be received (1502) as print input (e.g., support for editing braille directly in the braille display (504) may not be provided), and normalizing (1508) may include adding the print input to the print display (502), converting the print input into braille to be displayed in the braille display (504) (e.g., using one or more conversion tools such as LibLouis), converting the print input into XML to be saved to the underlying project data (e.g., a *.bbx file, *.bbz file, NIMAS file), and the updating the style display (506) to show any formatting or style associated with the print input.

An advantage of normalizing (1508) input, especially as it relates to mathematical content, is that it may advantageously allow a transcriber to work with mathematical content using their preferred input method, even where that input method does not match an eventual mathematical output requirement. For example, mathematical content in North America especially is commonly output in one of two formats: NEMETH, and UEB. For transcribers that are familiar with inputting content in one of these standards, it may be advantageous to provide the mathematical content as input using that standard, and then normalizing (1508) for storage and output in other standards. For example, with conventional tools, where a transcriber is particularly efficient with inputting NEMETH style mathematical content using a virtual six-key interface or other braille input interface, they may be unable to use those skills when working on a project containing mathematical content for a UEB work. Using the tools and interfaces described herein, such content could be input using NEMETH, and later encoded in UEB if desired. Normalizing (1508) the input, especially when performed to store the content (e.g., as MathML in a *.bbx file) also provides advantages in future proofing the transcribed content for output in future formats that may be desirable, both for mathematical content (e.g., where a foreign country may require a third standard) and normal text content (e.g., where content written in English may be formatted with French specific braille formatting in order to provide an English text work that is readable in French Braille).

Other implementations for normalizing (1508) received input exist and will be apparent to one of ordinary skill in the art in light of this disclosure. As has been described, once input has been normalized (1508), the interface builder (102) may synchronize (1510) and redisplay the impacted datasets, which may include updating the datasets, refreshing or redisplaying the updated datasets, and ensuring that the interface builder (102) displays corresponding sections and lines of each dataset in the print display (502), braille display (504), and the style display (506).

Figure 16:
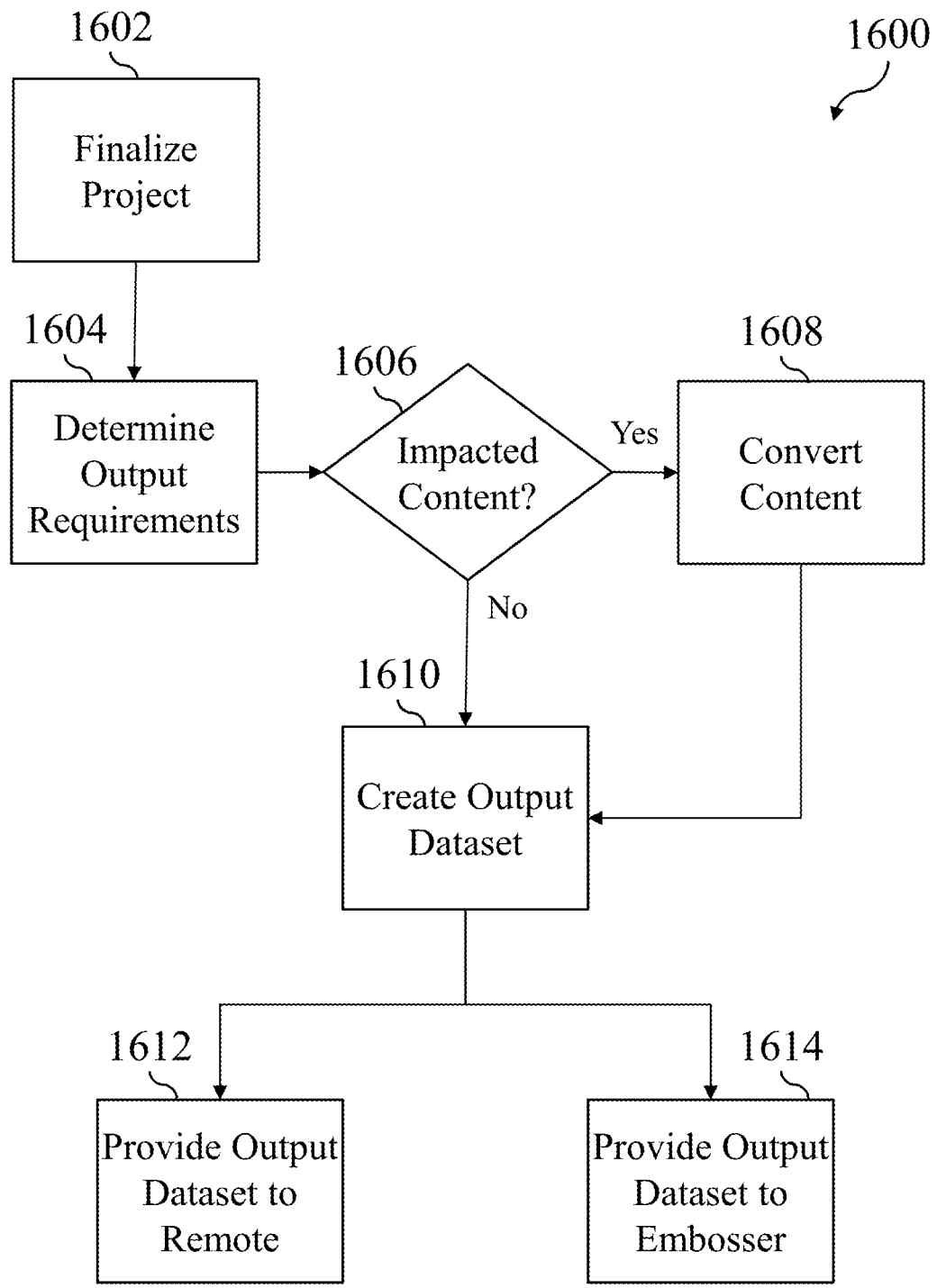
FIG. 16 shows a set of exemplary steps that may be performed to produce an output dataset for an accessible work.

When a transcriber completes a transcription project using the builder interface (102), the completed and transcribed work may be produced and used in varying ways. For example, FIG. 16 shows a set of exemplary steps (1600) that may be performed to produce an output dataset usable by an embossing device to produce a physical copy of a braille work. When a transcription project is finalized (1602), which may be performed by a user of the builder interface (102) or by an administrator of the transcription server (108), the project data may be used to produce such an output dataset. For example, a transcriptionist working locally to transcribe a NIMAS file set may complete transcription of the entire print content, resulting in the creation of a formatted and annotated braille dataset, and may save and commit the changes made to the project.

When finalizing (1602) the project, the system (10) may determine (1604) one or more output requirements for the work. Output requirements may include, for example, requiring that mathematical concepts be displayed according to one of several formatting requirements. The system (10) may determine such requirements based upon manual input, such as the user manually configuring the project for a particular country, state, or region, or by directly selecting desired output requirements from a list, or such requirements may be determined automatically based upon data associated with the project or the work itself. For example, the transcription server (108) may be configured to associate certain works or certain projects with one or more output requirements, or a NIMAS file set or other input file set may contain data specifying any formatting rules or requirements that must be applied when producing the output dataset. In some implementations, the user sets the required braille code via the translation settings and may change it after the work is completed to produce a second braille document in any desired braille code format.

Once any special output requirements have been determined (1604), the system (10) may then determine (1606) if any braille content within the project is impacted by the requirements. For example, a mathematical textbook is likely to contain large amounts of mathematical data, which may use one of several formatting rules to determine how it is expressed in braille. After determining (1604) one set of formatting rules to apply (e.g., based upon a state that the braille work will be offered or used within), the system (10) will analyze the structured version of the work (e.g., an XML project dataset or NIMAS file set that has been updated based on user inputs) and identify all of the mathematical data expressed within by identifying specific tags, objects, and other structured data. Once identified, the impacted content (1606) may be automatically converted (1608) based upon the determined (1604) requirements.

Continuing the above example, this may include converting the mathematical data, which may be stored in the project in various structured and predictable forms (e.g., as one or more of, AsciiMath, MathML, XML, or other encoded form) into the desired format. In some implementations, this may include receiving mathematical data as AsciiMath, automatically converting it to MathML, and stored in a braille project file, such as proprietary *.bbx or *.bbz file. By storing the content as structure data such as MathML, conversion tools (e.g., LibLouis) may be used automatically converted MathML to one or more desired braille codes at a later date.

Where there is no impacted content (1606), such as where the print work might be a literature textbook instead of a mathematical textbook, or where the impacted content (1606) has been converted (1608), the system (10) may then create (1610) an output dataset. The output dataset may be one or more files of a particular type (e.g., BRF, PEF), or a set of data that may be readily converted into such file types. For example, the interface builder (102) may create (1610) a BRF file type usable by devices such as the embosser (106), or may instead create a structured set of data that may be used to produce a BRF file type, a PEF file type, or other similar file types. The created (1610) output dataset may then be provided (1612) to another devices, such as the transcription server (108), where it may be stored, reviewed, distributed or further modified by an administration of the transcription server (108), and may also be provided (1614) to a device such as the embosser (106) in order to produce a physical copy of the braille work based upon the output dataset.

Figure 17:
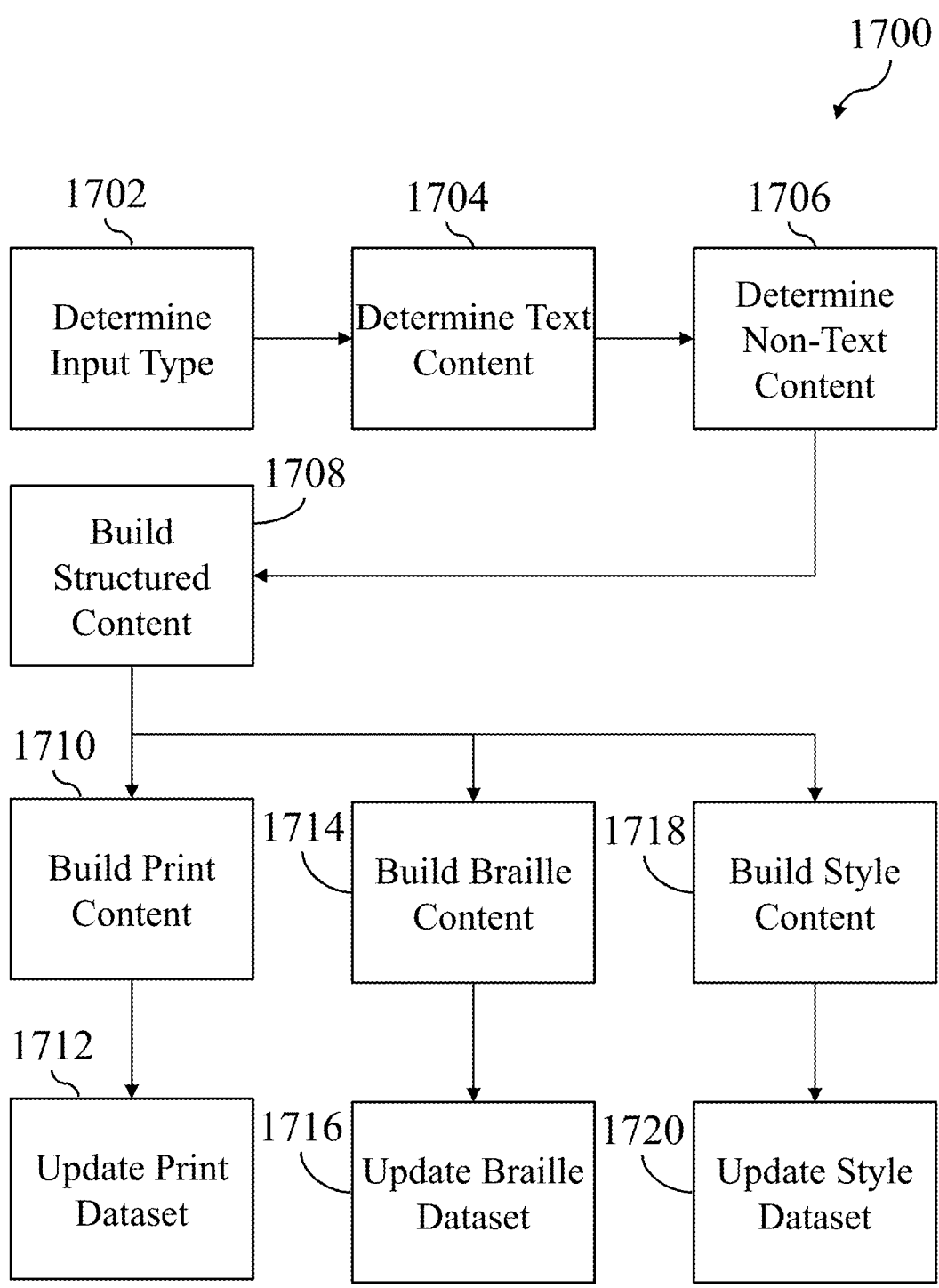
FIG. 17 shows a set of exemplary steps that may be performed to update datasets in response to inputs received via the builder interface.

Conversion of user input that is received via the builder interface (102) into braille or other formats has been discussed at a high level (e.g., normalizing (1508) input, synchronizing (1510) datasets based upon input), and it will be apparent to one of ordinary skill in the art, in light of this disclosure, that varying implementations exist for converting structured content into different formats. For example, FIG. 17 shows an exemplary set of steps that may be performed in order to synchronize and redisplay newly input content in different formats. When content is received via the builder interface (102), such as when a user types content into the print display (502) and then formats the content using one or more tools of the tools section (508), the builder interface (102) may determine (1702) the input type. The input type may be, for example, print input, received via the print display (502), or braille input, received via the braille display (504) or a virtual sex-key interface. In each scenario, the received input will be received in a structured format having certain predictable forms, attributes, and organizations. For example, print input may have text content, but may also have styling, structure, and other characteristics associated with the text content using one or more tools of the tools section (508) (e.g., text may be formatted as an exercise, a play, a poem, a list, a heading, bold, italic). As another example, braille input will also have content represented in braille cells, but the content braille cells may also be associated with non-content braille cells indicating a certain emphasis, type, or other attribute, as has been described.

When receiving this structured input, the builder interface (102) may determine (1704) a portion of the input that is text content, and determine a portion of the input that is non-text content (e.g., tags, formatting, or other data indicating style, structure, type). Since the text and non-text content can be determined (1704, 1706) and separated from the input, the builder interface (102) may then build (1708) a new set of structured content for the input (e.g., XML), which can be readily added to the transcription project input and output files (e.g., NIMAS file sets, embosser output files).

As an example, Table 3 shows an exemplary input that may be received by the builder interface (e.g., manually typed, or inserted using the formula builder interface (700). The determined (1704) text content may be the alphanumeric characters as they are shown in Table 3, while the determined (1706) non-text content may be style, structure, or type characteristics associated with the text content as metadata. If the text content alone is input to the print display (502) there may be no non-text content associated with it, but where the math builder interface (700) is used to insert the input there will be non-text content indicating that the input is structured mathematical content. Since the non-text content indicates that the input is structured mathematical content, the interface builder (102) may build (1708) a new set of structured content from the input. Table 4 shows an example of structured content that may be built (1708) from the structured input of Table 3. The content of Table 4 is stored as XML structured content, and may be readily added to, an XML based output file set, or other similar structured datasets. As can be seen, the text content of Table 3 is represented in the structured content of Table 4, but has been modified to include identifying tags and other structural indicators (e.g., <mrow>, <munderover>, <mfrac>).

TABLE 3

AsciiMath equation f(x) = sum_(n=0)^oo(((f^n)(a))/(n!))(x−a)^n

TABLE 4

AsciiMath equation stored as MathML

<math alttext="f(x) = sum_(n=0)^oo(((f^n)(a))/(n!))(x−a)^n"
xmlns="http://www.w3.org/1998/Math/MathML">
<mrow>
 <mi>f</mi>
 <mrow>
  <mo>(</mo>
  <mi>x</mi>
  <mo>)</mo>
 </mrow>
</mrow>
<mo>=</mo>
<mrow>
 <munderover>
  <mo>Σ</mo>
  <mrow>

TABLE 4-continued

AsciiMath equation stored as MathML

<mi>n</mi>
   <mo>=</mo>
   <mn>0</mn>
  </mrow>
  <mo>∞</mo>
 </munderover>
</mrow>
<mrow>
 <mo>(</mo>
 <mfrac>
  <mrow>
   <mrow>
    <mo>(</mo>
    <msup>
     <mi>f</mi>
     <mi>n</mi>
    </msup>
    <mo>)</mo>
   </mrow>
   <mrow>
    <mo>(</mo>
    <mi>a</mi>
    <mo>)</mo>
   </mrow>
  </mrow>
  <mrow>
   <mi>n</mi>
   <mo>!</mo>
  </mrow>
 </mfrac>
 <mo>)</mo>
 <msup>
  <mrow>
   <mo>(</mo>
   <mi>x</mi>
   <mo>-</mo>
   <mi>a</mi>
   <mo>)</mo>
  </mrow>
  <mi>n</mi>
 </msup>
</math>

After building (1708) the new structured content, the builder interface (102) may build (1710) print content that may be used to update (1712) the print dataset and print display (502). Building (1710) print content may be performed by interpreting and modifying structured data such as that shown in Table 4, and may result in text content such as that shown in Table 3 being updated (1712) and displayed via the print display (502).

The structured content of Table 4 may also be used to build (1714) braille content that may be used to update (1716) the braille dataset and braille display (504). Building (1714) braille content may be performed by interpreting the structured data, and using a set of braille conversion rules to convert both the text content and the non-text content into a formatted set of braille cells. As an example, the braille conversion rules may be applied to the structured content of Table 4, and identify the <math> tag, to determine that the contents within are mathematical content. Characters within <mi> tags may be interpreted as identifiers, while characters within <mo> tags may be interpreted as mathematical operators. By identifying the structured tags and their contents in this manner, the braille conversion rules may produce braille cells for each piece text content and non-text content.

The structured content of Table 4 may also be used to build (1718) style content that may be used to update (1720) the style dataset and style display (506). Building (1718) the style content may be performed by identifying the non-text content within the structure content. As an example, the <math> tag in Table 4 may be used to determine that the content contained within is all of a mathematics type, which may displayed in the style display (506), breadcrumb (510), or other areas.

While the advantages of a system such as the transcription system (10) have been described above, it should be noted that the unconventional components, steps, and combinations thereof described may be implemented to provide considerable advantages and improvements in efficiency and cost to the process of transcribing print works to accessible formats such as braille. As an example, use of the described tools and interfaces for transcription projects using a NIMAS file set as an input have been observed, in some cases, to be completed about 65% faster than a transcription project using the same NIMAS file set and conventional transcription software, though such efficiency will be dependent on numerous factors such as the content of the work, the skill of the transcriber, and their familiar with the disclosed interface. As another example, when used for transcription projects using EPUB as an input (e.g., another standardized publisher format describing a text work), such projects have been observed, in some cases, to be completed about 800% faster than a transcription project using the same EPUB file and conventional transcription software, with such efficiency again being dependent upon various factors such as the content of the work, and skill of the transcriber.

Further variations on, and features for, the inventors' technology will be immediately apparent to, and could be practiced without undue experimentation by, those of ordinary skill in the art in light of this disclosure. Accordingly, instead of limiting the protection accorded by this document, or by any document which is related to this document, to the material explicitly disclosed herein, the protection should be understood to be defined by the claims, if any, set forth herein or in the relevant related document when the terms in those claims which are listed below under the label "Explicit Definitions" are given the explicit definitions set forth therein, and the remaining terms are given their broadest reasonable interpretation as shown by a general purpose dictionary. To the extent that the interpretation which would be given to such claims based on the above disclosure is in any way narrower than the interpretation which would be given based on the "Explicit Definitions" and the broadest reasonable interpretation as provided by a general purpose dictionary, the interpretation provided by the "Explicit Definitions" and broadest reasonable interpretation as provided by a general purpose dictionary shall control, and the inconsistent usage of terms in the specification or priority documents shall have no effect.

Explicit Definitions

When appearing in the claims, a statement that something is "based on" something else should be understood to mean that something is determined at least in part by the thing that it is indicated as being "based on." When something is required to be completely determined by a thing, it will be described as being "based exclusively on" the thing.

When used in the claims, "configured" should be understood to mean that the thing "configured" is adapted, designed or modified for a specific purpose. An example of "configuring" in the context of computers is to provide a computer with specific data (which may include instructions) which can be used in performing the specific acts the computer is being "configured" to do. For example, installing Microsoft® WORD on a computer "configures" that computer to function as a word processor, which it does by using the instructions for Microsoft WORD in combination with other inputs, such as an operating system, and various peripherals (e.g., a keyboard, monitor, etc).

When used in the claims, "determining" should be understood to refer to generating, selecting, defining, calculating or otherwise specifying something. For example, to obtain an output as the result of analysis would be an example of "determining" that output. As a second example, to choose a response from a list of possible responses would be a method of "determining" a response. As a third example, to identify data received from an external source (e.g., a microphone) as being a thing would be an example of "determining" the thing.

When used in the claims, a "means for providing a transcription interface operable to transcribe the project input dataset into a braille version of the work" should be understood as a limitation set forth in the form of a means for performing a specified function as provided for in the sixth paragraph of 35 U.S.C. § 112 in which the specified function is "providing a transcription interface operable to transcribe the project input dataset into a braille version of the work" and the corresponding structure is a system having physical components such as the transcription device described in paragraph [0025], where the transcription device is programmed to provide a builder interface with tools and features usable during transcription (examples provided in FIGS. 4-14 and their associated descriptions in the detailed description).

When used in the claims, a "set" should be understood to refer to a collection containing zero or more objects of the type that it refers to. So, for example, a "set of integers" describes an object configured to contain an integer value, which includes an object that contains multiple integer values, an object that contains only a single integer value, and an object that contains no integer value whatsoever.

The invention claimed is:

1. A transcription system comprising:
   (a) a transcription device comprising a display, a user input device, a processor, and a memory, wherein the processor is configured to receive user inputs via the user input device, display information via the display, and execute instructions stored on the memory;
   (b) a set of transcription interface instructions stored on the memory, wherein the set of transcription interface instructions are configured to be executed by the processor to cause the transcription device to provide a transcription interface;
   wherein the transcription interface is configured to:
      (i) receive a project input dataset and open a project, wherein the project input dataset describes a printed version of a work associated with the project;
      (ii) create a print dataset based upon the project input dataset, wherein the print dataset is configured to be displayed as the printed version of the work;
      (iii) create a braille dataset based upon the project input dataset, wherein the braille dataset is configured to be displayed as a braille version of the work;
      (iv) via the display, provide a synchronized display of corresponding sections of the print dataset and the braille dataset; and
      (v) provide a mathematics tool that is operable by a user to:
         (A) receive, as a math input, a number line input comprising a line interval, a line start, a line end, a segment start, and a segment end, that describes mathematical data in an input format;

(B) determine, based upon the number line input, a spatial layout associated with the number line input; and (C) based upon the math input, create and add a print mathematics to the print dataset in a first format, create and add a braille mathematics to the braille dataset in a second format, and create and add a structured mathematics to the project input dataset in a third format wherein the creating of the braille mathematics is based upon the number line input and the spatial layout, wherein the braille mathematics are configured to display via the synchronized display in the spatial layout.

2. The transcription system of claim 1, wherein the transcription interface is further configured to create a project output dataset based upon the project input dataset, wherein the project output dataset is configured to be usable by a braille printing device to produce a braille copy of the work.

3. The transcription system of claim 2, further comprising the braille printing device, wherein the transcription interface is further configured to provide the project output dataset to the braille printing device and cause the braille printing device to produce the braille copy of the work.

4. The transcription system of claim 1, wherein:
(a) the first format and the input format comprise an AsciiMath format;
(b) the second format comprises a braille cell format; and
(c) the third format comprises a MathML format.

5. The transcription system of claim 1, wherein the transcription interface is further configured to:
(a) receive a math format identifier from the user, wherein the math format identifier identifies a math format from a plurality of math formats, and wherein each of the plurality of math formats describes a set of requirements for expressing mathematical data in braille; and
(b) create the braille mathematics based upon the math input and the math format.

6. The transcription system of claim 5, wherein the transcription interface is further configured to:
(a) receive a format change from the user, wherein the format change identifies a new math format from the plurality of math formats; and
(b) update the braille mathematics based upon the math input and the new math format.

7. The transcription system of claim 1, wherein the mathematics tool is further operable by a user to:
(a) receive, as the math input, a mathematical operator, a first operand, and a second operand;
(b) apply a spatial layout to the math input based upon the mathematical operator; and
(c) create the braille mathematics based upon the math input and the spatial layout, wherein the braille mathematics are configured to display via the synchronized display in the spatial layout.

8. The transcription system of claim 1, wherein the transcription interface is further configured to provide an image tool that is operable by the user to:
(a) display an image associated with the work;
(b) receive an image description from the user and associate the image description with the image;
(c) update the print dataset and the braille dataset based upon the image description association with the image; and (d) in response to receiving an indication that the user has activated an image navigation feature of the image tool, display a second image associated with the work in place of the image.

9. The transcription system of claim 8, wherein the image tool is further configured to:
(a) identify a set of duplicate images within a set of images associated with the work, wherein the set of duplicate images are identical to the image;
(b) associate the image description with each of the set of duplicate images; and
(c) update the print dataset and the braille dataset based upon the image description association with the set of duplicate images.

10. The transcription system of claim 1, wherein the transcription interface is further configured to:
(a) create a style dataset based upon the project input dataset, wherein the style dataset is configured to be displayed as a set of style and structure descriptions of the work;
(b) provide the synchronized display of corresponding sections of the print dataset, the braille dataset, and the style dataset;
(c) determine a cursor location of a cursor placed by the user within the print dataset; and
(d) display a breadcrumb that describes a hierarchy of styles and structures based upon the cursor location.

11. The transcription system of claim 1, wherein the user input device is a keyboard, and wherein the transcription interface is further configured to:
(a) receive a print input from the user via the user input device and add the print input to the print dataset;
(b) provide a virtual keyboard tool that is operable by a user to receive a braille input from the user via the user input device; and
(c) add the braille input to the braille dataset.

12. A method for assisting a user in transcription of a print work to a braille work comprising:
(a) receiving, at a transcription device, a project input dataset and opening a project, wherein the project input dataset describes a printed version of a work associated with the project;
(b) creating a print dataset based upon the project input dataset, wherein the print dataset is configured to be displayed as the printed version of the work;
(c) creating a braille dataset based upon the project input dataset, wherein the braille dataset is configured to be displayed as a braille version of the work;
(d) providing, via a display of the transcription device, a synchronized display of corresponding sections of the print dataset and the braille dataset; and
(e) providing a mathematics tool that is operable by the user to:
(i) receive, as a math input, a number line input comprising a line interval, a line start, a line end, a segment start, and a segment end, that describes mathematical data in an input format; and
(ii) determine, based upon the number line input, a spatial layout associated with the number line input; and
(ii) based upon the math input, create and add a print mathematics to the print dataset in a first format, create and add a braille mathematics to the braille dataset in a second format, and create and add a structured mathematics to the project input dataset in a third format, wherein the creation of the braille mathematics is based upon the number line input and the spatial layout, wherein the braille mathematics are configured to display via the synchronized display in the spatial layout.

13. The method of claim 12, further comprising:
(a) creating a project output dataset based upon the project input dataset; and
(b) providing the project output dataset to a braille printing device;
wherein the project output dataset is configured to be usable by the braille printing device to produce a braille copy of the work.

14. The method of claim 12, further comprising:
(a) receiving a math format identifier from the user, wherein the math format identifier identifies a math format from a plurality of math formats, and wherein each of the plurality of math formats describes a set of requirements for expressing mathematical data in braille;
(b) creating the braille mathematics based upon the math input and the math format;
(c) receiving a format change from the user, wherein the format change identifies a new math format from the plurality of math formats; and
(d) updating the braille mathematics based upon the math input and the new math format.

15. The method of claim 12, further comprising:
(a) receiving, as the math input, a mathematical operator, a first operand, and a second operand;
(b) applying a spatial layout to the math input based upon the mathematical operator; and
(c) creating the braille mathematics based upon the math input and the spatial layout, wherein the braille mathematics are configured to display via the synchronized display in the spatial layout.

16. The method of claim 12, further comprising providing an image tool that is operable by the user to:
(a) display an image associated with the work;
(b) receive an image description from the user and associate the image description with the image;
(c) update the print dataset and the braille dataset based upon the image description association with the image; and
(d) in response to receiving an indication that the user has activated an image navigation feature of the image tool, display a second image associated with the work in place of the image.

17. The method of claim 16, wherein the image tool is further configured to:
(a) identify a set of duplicate images within a set of images associated with the work, wherein the set of duplicate images are identical to the image;
(b) associate the image description with each of the set of duplicate images; and
(c) update the print dataset and the braille dataset based upon the image description association with the set of duplicate images.

* * * * *